(12) United States Patent
Ida et al.

(10) Patent No.: US 12,025,748 B2
(45) Date of Patent: Jul. 2, 2024

(54) SIGNAL PROCESSING APPARATUS, DISTANCE MEASURING APPARATUS, AND DISTANCE MEASURING METHOD

(71) Applicant: KABUSHIKI KAISHA TOSHIBA, Minato-ku (JP)

(72) Inventors: Takashi Ida, Kawasaki (JP); Kenzo Isogawa, Yokohama (JP); Atsushi Matsumura, Yokohama (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 1354 days.

(21) Appl. No.: 16/288,337

(22) Filed: Feb. 28, 2019

(65) Prior Publication Data

US 2020/0088856 A1 Mar. 19, 2020

(30) Foreign Application Priority Data

Sep. 14, 2018 (JP) .................................. 2018-172945

(51) Int. Cl.
*G01S 7/487* (2006.01)
*G01S 17/10* (2020.01)
(Continued)

(52) U.S. Cl.
CPC ............ *G01S 7/4876* (2013.01); *G01S 17/10* (2013.01); *G01S 17/89* (2013.01); *G06T 5/70* (2024.01);
(Continued)

(58) Field of Classification Search
CPC ........... G06T 5/002; G06T 2207/10028; G06T 2207/20081; G06T 2207/20084;
(Continued)

(56) References Cited

U.S. PATENT DOCUMENTS 9,760,837 B1 9/2017 Nowozin et al.
11,526,995 B2 * 12/2022 Jouppi .................... G06T 7/194
(Continued)

FOREIGN PATENT DOCUMENTS

JP 4-47472 A 2/1992
JP 4-296630 A 10/1992
(Continued)

OTHER PUBLICATIONS

Zhang et al.; "Image Denoising Method Based on a Deep Convolution Neural Network"; Apr. 2018; IET Image Processing; vol. 12, Issue 4; pp. 485-493 (Year: 2018).*
(Continued)

*Primary Examiner* — Ryan M Gray
(74) *Attorney, Agent, or Firm* — Oblon, McClelland, Maier & Neustadt, L.L.P.

(57) ABSTRACT

According to one embodiment, a signal processing apparatus includes a memory and a processing circuit. The memory stores a learned model for generating restoration data by restoring deterioration of a signal based on data of the signal and data related to a position of a sample of the signal. The processing circuit inputs data of the signal and data related to the position to the learned model. The processing circuit generates the restoration data by using the learned model.

6 Claims, 20 Drawing Sheets

(51) Int. Cl.
*G01S 17/89* (2020.01)
*G06T 5/70* (2024.01)

(52) U.S. Cl.
CPC .............. *G06T 2207/10028* (2013.01); *G06T 2207/20081* (2013.01); *G06T 2207/20084* (2013.01)

(58) Field of Classification Search
CPC ........ G01S 7/4876; G01S 17/10; G01S 17/89; G01S 7/487
See application file for complete search history.

(56) References Cited

U.S. PATENT DOCUMENTS

| | | | |
|---|---|---|---|
| 2018/0293710 A1* | 10/2018 | Meyer | G06T 5/002 |
| 2018/0349759 A1 | 12/2018 | Isogawa et al. | |
| 2018/0352177 A1* | 12/2018 | Komiya | G06T 5/002 |
| 2019/0005603 A1* | 1/2019 | Chen | G06T 5/003 |
| 2019/0378247 A1* | 12/2019 | Huang | G06T 5/003 |
| 2019/0378248 A1 | 12/2019 | Ida et al. | |
| 2020/0244842 A1* | 7/2020 | Xiao | G06T 5/002 |
| 2021/0125310 A1* | 4/2021 | Pu | G06T 5/002 |
| 2021/0209766 A1* | 7/2021 | Cho | G06T 7/0014 |
| 2022/0067514 A1* | 3/2022 | Ida | G06N 3/0481 |

FOREIGN PATENT DOCUMENTS

| | | |
|---|---|---|
| JP | 2003-218806 A | 7/2003 |
| JP | 2018-77786 A | 5/2018 |
| JP | 2018-206382 | 12/2018 |
| JP | 2019-211391 A | 12/2019 |

OTHER PUBLICATIONS

Xu, Xiangyu, Muchen Li, and Wenxiu Sun. "Learning deformable kernels for image and video denoising." arXiv preprint arXiv:1904.06903 (2019).*

Zhang, Kai, et al. "Beyond a gaussian denoiser: Residual learning of deep cnn for image denoising." IEEE transactions on image processing 26.7 (2017): 3142-3155.*

Svoboda, Pavel, et al. "Compression artifacts removal using convolutional neural networks." arXiv preprint arXiv:1605.00366 (2016).*

K. Zhang et al., "Beyond a Gaussian Denoiser: Residual Learning of Deep CNN for Image Denoising", IEEE Transactions on Image Processing, vol. 26, No. 7, 2017, pp. 3142-3155.

M. Joodaki et al., "Using Neural Networks for High Resolution Distance Measurements in Pulsed Laser Radar", IEEE Instrumentation and Measurement Technology Conference, May 21-23, 2001, pp. 1242-1246 and Cover page.

* cited by examiner

| $\dfrac{1}{m \times n}$ | $\dfrac{2}{m \times n}$ | ... | $\dfrac{m}{m \times n}$ |
|---|---|---|---|
| $\dfrac{m+1}{m \times n}$ | $\dfrac{m+2}{m \times n}$ | ... | $\dfrac{2m}{m \times n}$ |
| $\dfrac{2m+1}{m \times n}$ | $\dfrac{2m+2}{m \times n}$ | ... | $\dfrac{3m}{m \times n}$ |
| ⋮ | ⋮ | ... | ⋮ |
| $\dfrac{m \times (n-1)+1}{m \times n}$ | $\dfrac{m \times (n-1)+2}{m \times n}$ | ... | $1$ | m PIXELS (columns), n PIXELS (rows), ~102

F I G. 4

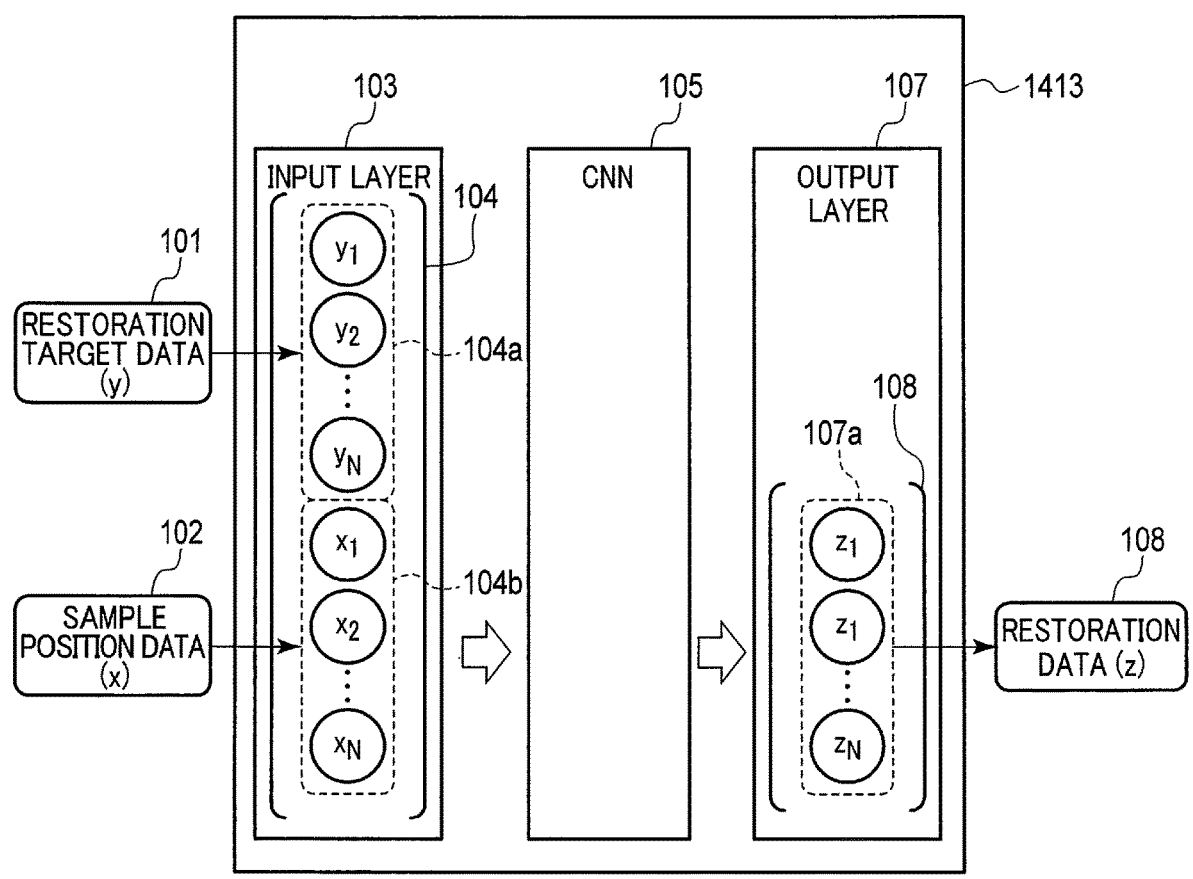
F I G. 6

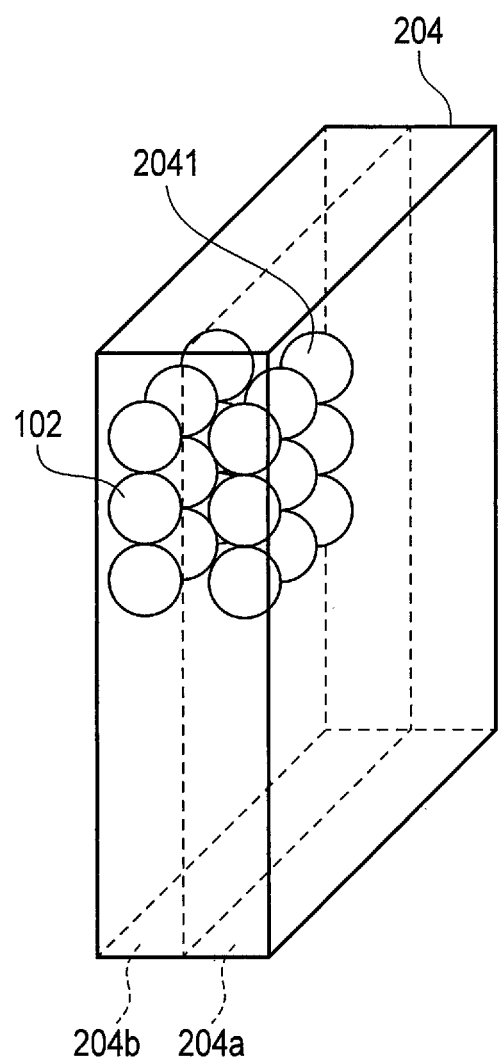
F I G. 10

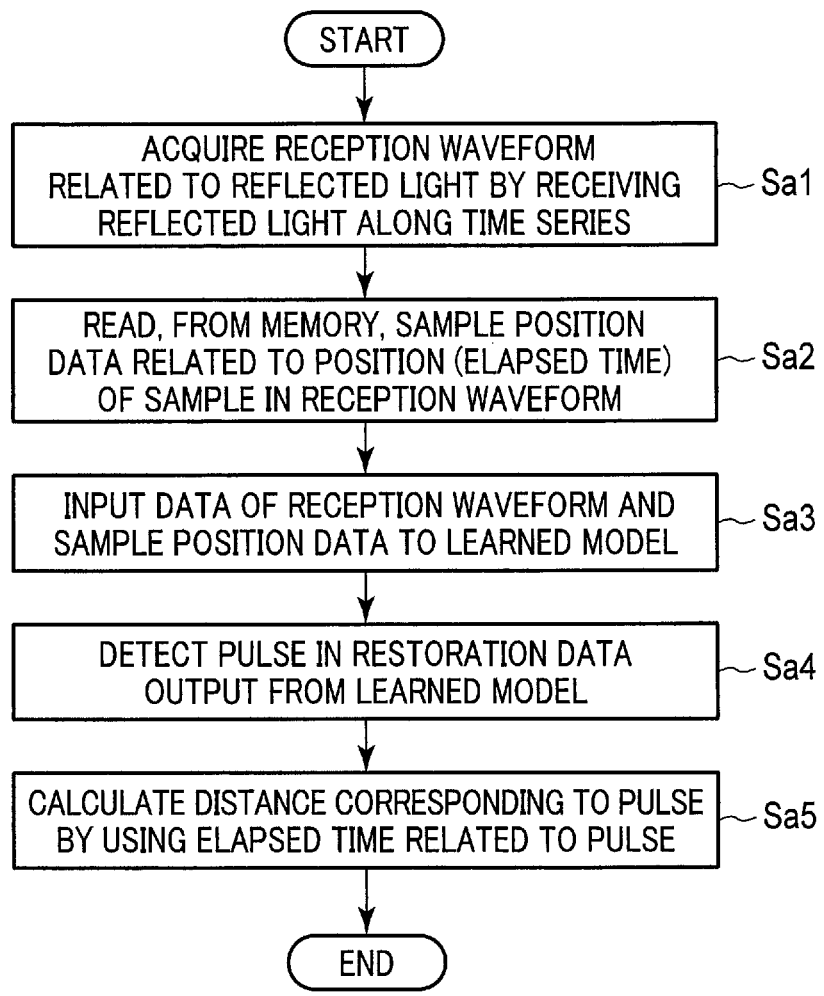
F I G. 12

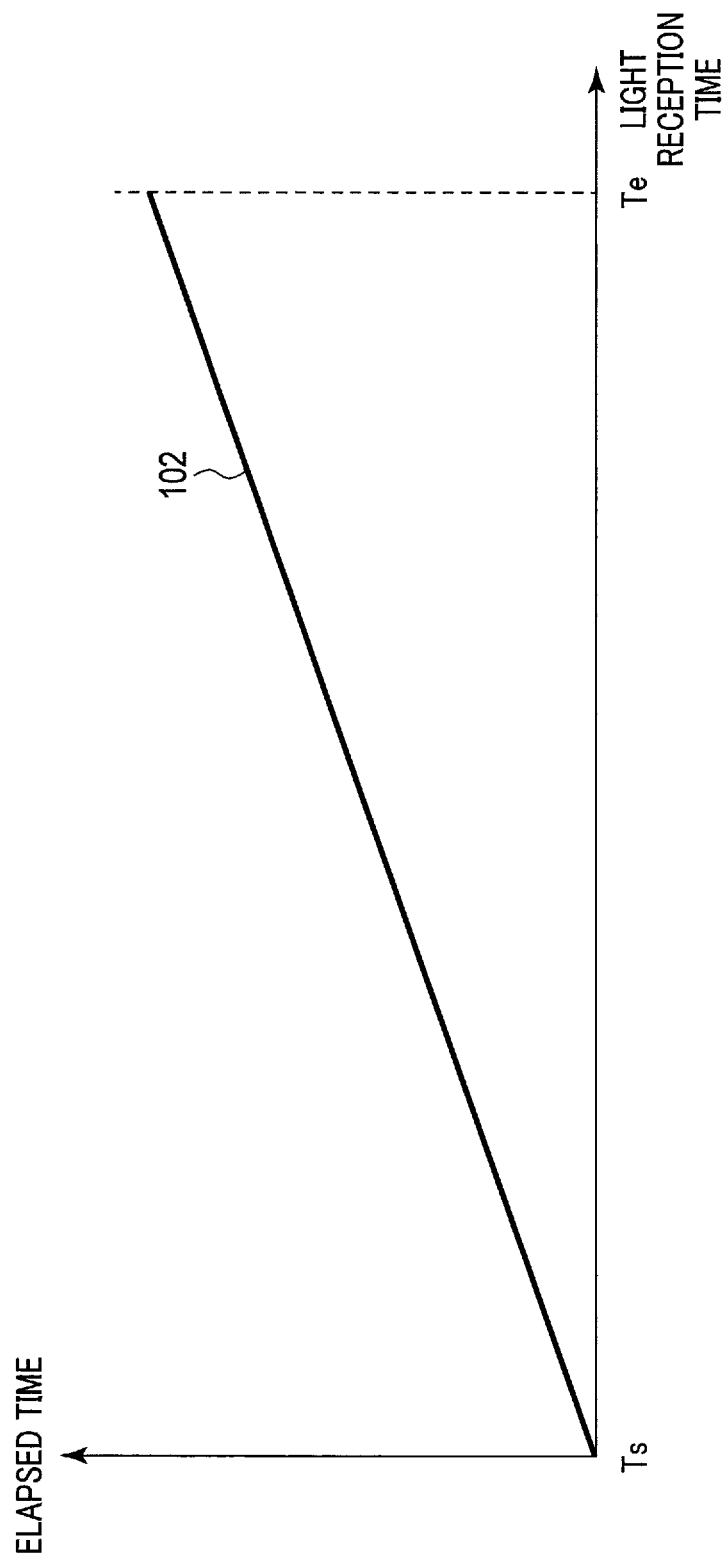
F I G. 15

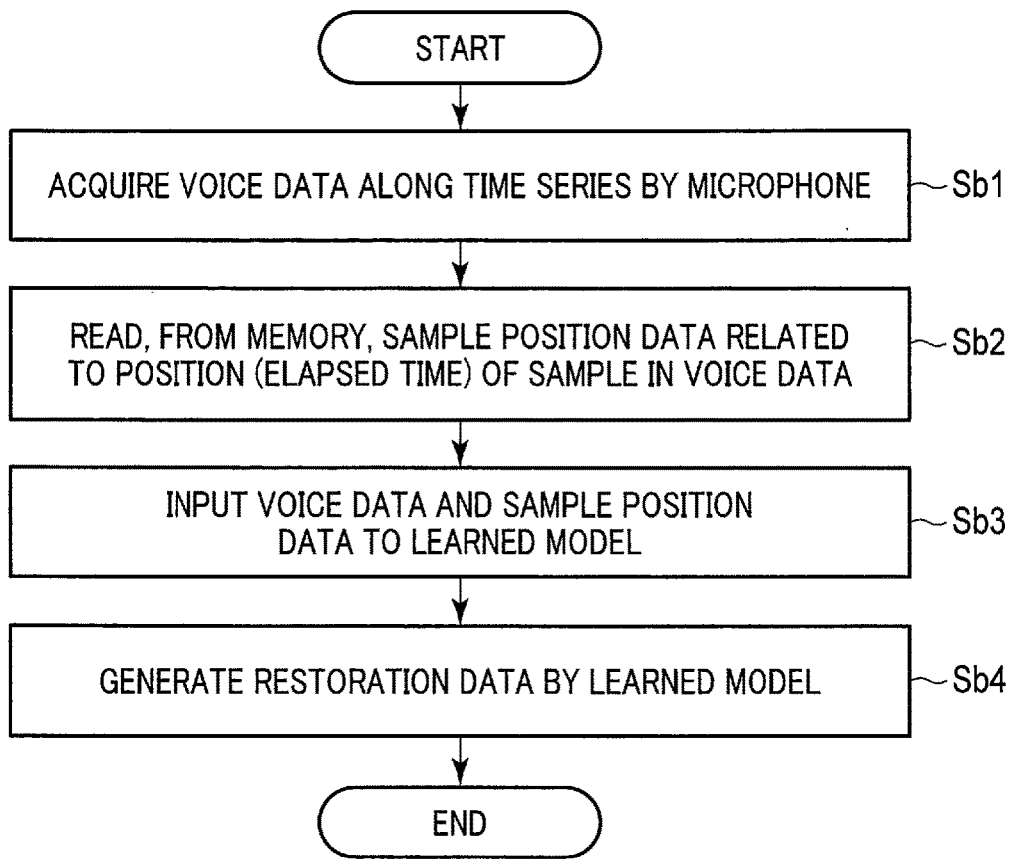
F I G. 19
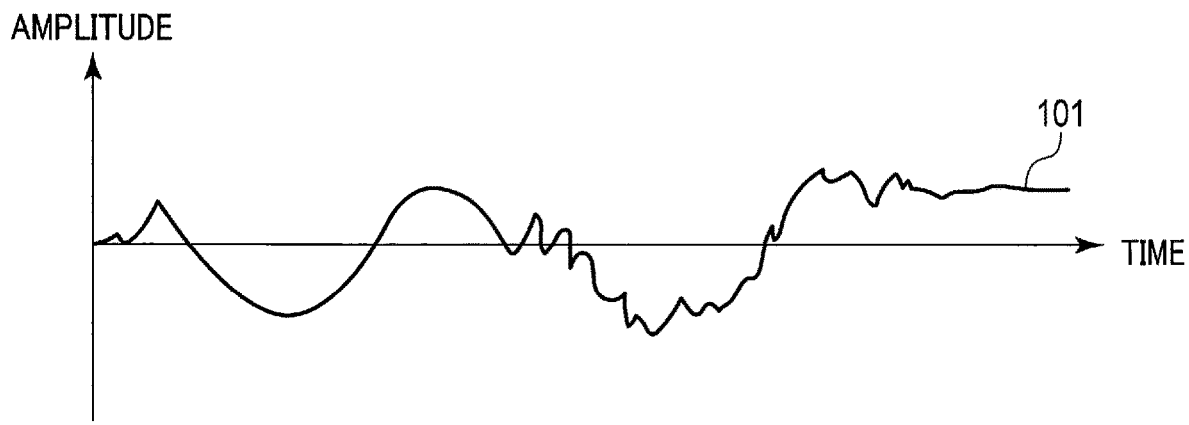
F I G. 20

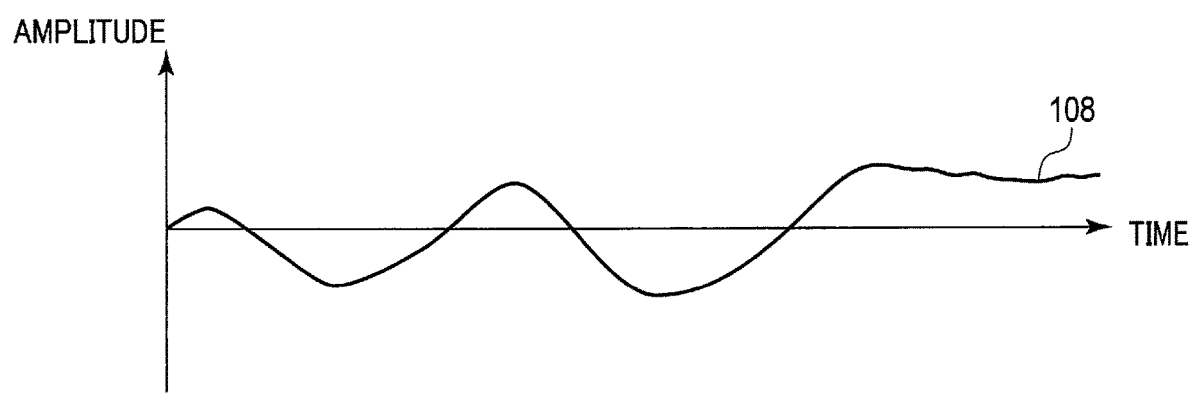
F I G. 21

SIGNAL PROCESSING APPARATUS, DISTANCE MEASURING APPARATUS, AND DISTANCE MEASURING METHOD

CROSS-REFERENCE TO RELATED APPLICATIONS

This application is based upon and claims the benefit of priority from the prior Japanese Patent Applications No. 2018-172945, filed Sep. 14, 2018; the entire contents of which are incorporated herein by reference.

FIELD

Embodiments described herein relate generally to a signal processing apparatus, a distance measuring apparatus, and a distance measuring method.

BACKGROUND

Noise included in images acquired by capturing photographs or videos causes various adverse effects such as deterioration in appearance when printed or displayed on a display, deterioration in visibility in security cameras or the like, and reduction in recognition rate in various image recognition apparatuses. Therefore, it is preferable to remove noise before image display or the like.

Noise removal by the image processing is basically realized by suppressing the amplitude of noise through smoothing. At this time, for example, a complicated technique applied to image pattern may be performed so that an original edge of an image signal (portion where luminance sharply changes) or a texture (fine pattern) is not blurred together with noise. On the other hand, in recent years, an image noise removal method using a simple convolution neural network (hereinafter referred to as CNN) has been proposed as having high signal restoration accuracy.

However, in the image noise removal method using the CNN, since smoothing strength cannot be controlled, the same process is performed on the entire screen. Therefore, for example, noise remains in regions with much noise such as dark portions of the photograph, and an original signal may also be smoothed in regions with less noise such as bright portions of the photograph. That is, in the CNN, since convolution is performed using the same weighting factor over the entire region of the input image, noise remains in the region having more noise than noise assumed at the time of learning in the image output from the CNN, and an original pixel value is also smoothed in a region having less noise than noise assumed at the time of learning. However, when the CNN is learned using a wide range of noise amount, there is a problem that the accuracy of noise reduction (accuracy of signal restoration) in images is deteriorated.

BRIEF DESCRIPTION OF THE DRAWINGS

FIG. 4 is a diagram illustrating an example of a sample position image in the present embodiment;

FIG. 6 is a diagram illustrating an example of combination data in an input layer and an output vector generated in an output layer in the present embodiment;

FIG. 10 is a diagram illustrating an example of a first intermediate layer to which a sample position image is input in a modification example of the present embodiment;

FIG. 12 is a flowchart showing an example of a procedure of a data restoration process in the first application example of the present embodiment;

FIG. 15 is a diagram illustrating an example of sample position data in the first application example of the present embodiment;

FIG. 19 is a flowchart showing an example of a procedure of a data restoration process in a second application example of the present embodiment;

FIG. 20 is a diagram illustrating an example of voice data in the second application example of the present embodiment;

FIG. 21 is a diagram illustrating an example of denoise data along time series in the second application example of the present embodiment;

DETAILED DESCRIPTION

Figure 1:
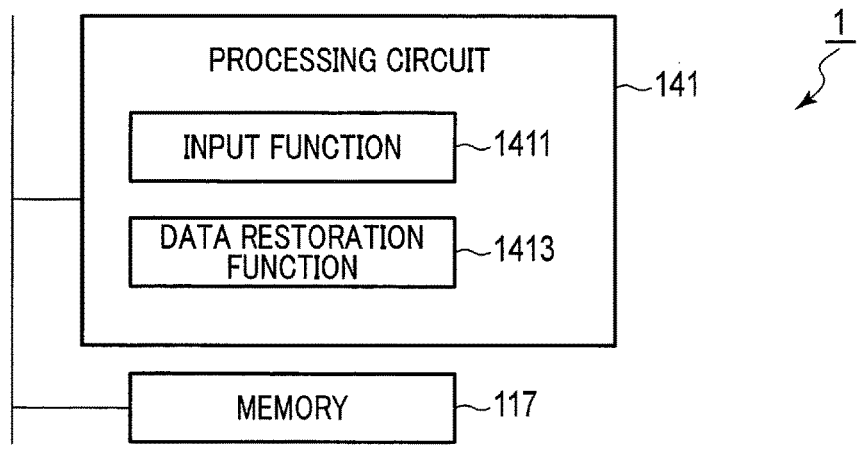
FIG. 1 is a block diagram illustrating a configuration example of a signal processing apparatus according to the present embodiment.

According to one embodiment, a signal processing apparatus includes a memory and a processing circuit. The memory stores a learned model for generating restoration data by restoring deterioration of a signal based on data of the signal and data related to a position of a sample of the signal. The processing circuit inputs data of the signal and data related to the position to the learned model. The processing circuit generates the restoration data by using the learned model.

An object is to provide a signal processing apparatus, a distance measuring apparatus, and a distance measuring method, which are capable of improving signal restoration accuracy.

Hereinafter, the present embodiment will be described with reference to the drawings. In the following description, elements having substantially the same configuration are denoted by the same reference numerals, and redundant descriptions thereof are given only when necessary.

FIG. 1 is a block diagram illustrating a configuration example of a processing circuit 141 and a memory 117 mounted on a signal processing apparatus 1 according to the present embodiment. The signal processing apparatus 1 is mounted on a distance measuring apparatus, a voice processing apparatus, and a vibration measuring apparatus, and a case where the present embodiment is realized by these apparatuses will be described later as an application example.

The processing circuit 141 includes a processor (not illustrated) and a memory such as read only memory (ROM) or random access memory (RAM) as hardware resources. The processing circuit 141 has an input function 1411 and a data restoration function 1413. Various functions executed by the input function 1411 and the data restoration function 1413 are stored in various storage circuits such as a storage apparatus (not illustrated) or a memory 117 in the form of programs that are executable by a computer. The processing circuit 141 is a processor that realizes functions corresponding to the respective programs by reading programs corresponding to these various functions from the storage circuit and executing the read programs. In other words, the processing circuit 141 in a state in which each program is read has the respective functions illustrated in the processing circuit 141 of FIG. 1. The input function 1411 and the data restoration function 1413 of the processing circuit 141 are examples of an input unit and a data restoration unit, respectively. In addition, the memory 117 is an example of a storage unit.

The term "processor" used in the above description may refer to, for example, a circuit such as a central processing unit (CPU), a micro processing unit (MPU), a graphic processing unit (GPU), an application specific integrated circuit (ASIC), a programmable logic device (for example, a simple programmable logic device (SPLD), a complex programmable logic device (CPLD), or a field programmable gate array (FPGA).

The processor realizes the function by reading the program stored in the memory circuit and executing the read program. Instead of storing the program in the memory circuit, the program may be directly embedded in the circuit of the processor. In this case, the processor realizes the function by reading the program embedded in the circuit and executing the read program.

Hereinafter, the input function 1411 and the data restoration function 1413 executed in the processing circuit 141 will be described with reference to FIGS. 2 to 8.

Figure 2:
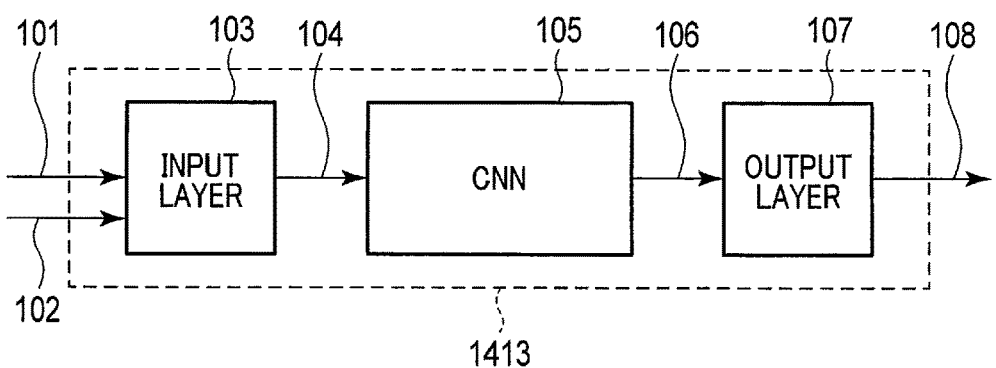
FIG. 2 is a diagram illustrating an example of an outline of a learned model performed in a data restoration function in the present embodiment.

FIG. 2 is a diagram illustrating an example of an outline of a learned model 105 performed in the data restoration function 1413. The learned model 105 is a learned machine learning model of a forward propagation network learned from many learning data. The learned model 105 is, for example, a deep neural network (hereinafter referred to as DNN) having a convolution layer as an intermediate layer at least in part. The learned model 105 is stored in the memory 117.

In the following, for the sake of concrete explanation, explanation will be given taking as an example a convolution neural network (hereinafter referred to as CNN) as a DNN. The learned model 105 is stored in various storage circuits such as a storage apparatus (not illustrated) and a memory. Note that the learned model 105 is not limited to the DNN and the CNN, and may be other machine learning models. Note that the CNN 105 illustrated in FIG. 2 may include an input layer 103 and an output layer 107. The CNN 105 has a plurality of intermediate layers. Hereinafter, for simplicity of explanation, the CNN 105 will be described as having three intermediate layers. Note that the number of intermediate layers in the CNN 105 is not limited to three, and can be arbitrarily set before CNN learning.

As illustrated in FIG. 2, the process performed in the data restoration function 1413 has a process in the input layer 103, a process in the CNN 105, and a process in the output layer 107. In the input layer 103, a signal (hereinafter referred to as restoration target data) 101 to be restored from signal deterioration and data (hereinafter referred to as sample position data) 102 indicating the position of the sample in the restoration target data 101 are set by the input function 1411. The position of the sample corresponds to, for example, a temporal or spatial index (or label) of the sample.

The memory 117 stores the restoration target data 101 and the sample position data 102. In addition, the memory 117 stores a learned model for generating restoration data by restoring signal deterioration based on the data of the signal (the restoration target data 101) and the data related to the position of the sample of the signal (the sample position data 102). Note that the restoration target data 101 corresponding to the data of the signal may be directly output from various generators, which generate restoration target data, to the input layer 103. In addition, the sample position data 102 may be data similar to the data used at the time of generating the learned model by the data restoration function 1413 in the processing circuit 141, and may be generated regardless of the restoration target data 101.

In the present embodiment, it is assumed that the data of the signal such as the restoration target data 101 is, for example, data related to a two-dimensional image. In this case, the position of the sample of the signal is coordinates of a pixel in the image, and the sample position data 102 is, for example, data having the coordinate value of the pixel. Generally, as the sample position data 102, data correlating with the degree of certain properties of the signal related to the restoration target data 101 is used with respect to the position of the sample. In addition, the signal related to the restoration target data 101 may be a one-dimensional time-series signal along the time series. At this time, the position of the sample of the signal corresponds to the time or the like of the sample. The time of the sample is, for example, a collection time at which the sample was collected. The signal deterioration is, for example, noise. A case where the restoration target data 101 corresponds to a one-dimensional signal will be described in detail in an application example described later.

The memory 117 is, for example, semiconductor memory element such as ROM, RAM, or flash memory, hard disk drive, solid state drive, or optical disk. In addition, the memory 117 may be a driving apparatus or the like that reads and writes a variety of information with a portable storage medium such as CD-ROM drive, DVD drive, or flash memory.

Hereinafter, for the sake of concrete explanation, noise removal of image will be described as an example. At this time, the restoration target data 101 corresponds to the noise removal target image, and the sample position data 102 corresponds to the sample position image.

Figure 3:
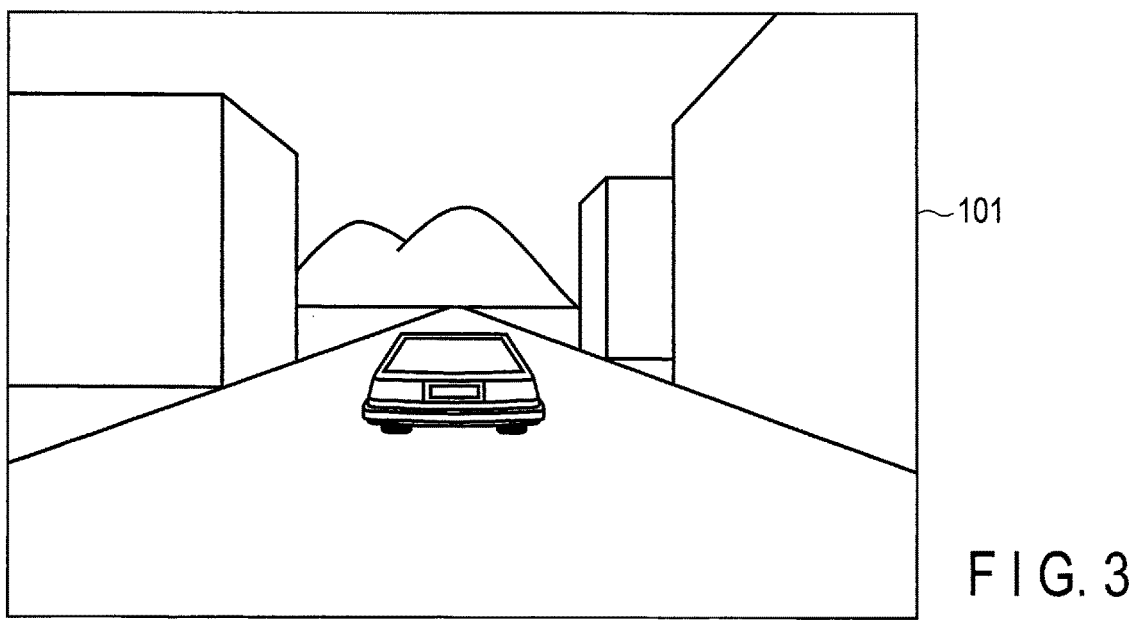
FIG. 3 is a diagram illustrating an example of a two-dimensional noise removal target image in the present embodiment.

FIG. 3 is a diagram illustrating an example of a two-dimensional noise removal target image 101. FIG. 4 is a diagram illustrating an example of the sample position image 102. For the sake of concrete explanation, it is assumed that the total number of pixels of the noise removal target image 101 is m×n pixels (m and n are natural numbers). At this time, for each of the pixels in the sample position image 102, for example, as illustrated in FIG. 4, it is assumed that the pixel value of the upper left pixel of the sample position image 102 is 1/(m×n), the pixel value of the lower right of the sample position image 102 is 1, and monotonically increasing numerical values are allocated from the left to the right of the sample position image 102 and from the top to the bottom of the sample position image 102. Note that the sample position image 102 is not limited to the image corresponding to the coordinates of the pixel as illustrated in FIG. 4. For example, for each of the pixels in the sample position image 102, values for identifying the position of the pixel, such as monotonically decreasing numerical values, may be allocated from the left to the right of the sample position image 102 and from the top to the bottom of the sample position image 102.

Figure 5:
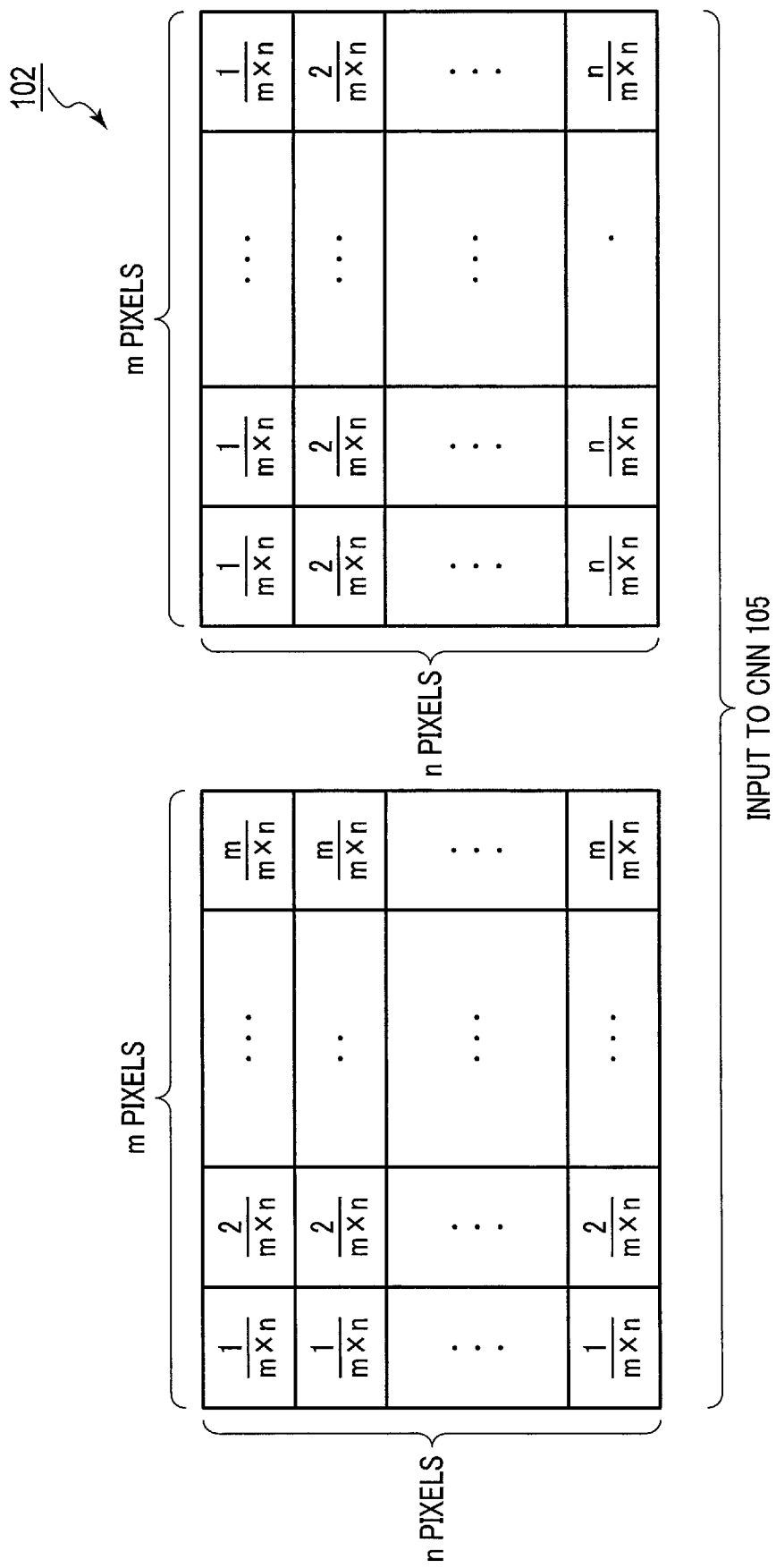
FIG. 5 is a diagram illustrating an example of two sample position images in the present embodiment.

In addition, the sample position image 102 is not limited to one image, and may be, for example, two sample position images 102 as illustrated in FIG. 5. At this time, for example, a plurality of pixel values shown in the first row illustrated in FIG. 4 are allocated to one sample position images among the two sample position images 102 in each row. In addition, a plurality of pixel values obtained by vertically arranging the plurality of pixel values shown in the first row illustrated in FIG. 4 are allocated to the other sample position image among the two sample position images 102 in each column.

Under the control of the processing circuit 141, the input layer 103 outputs, to the CNN 105, data (hereinafter referred to as combination data) 104 that is a combination of the noise removal target image 101 and the sample position image 102. The CNN 105 recursively repeats the conversion of the combination data 104, that is, performs the forward propagation process by using the combination data 104 as the input and outputs the converted signal 106 to the output layer 107. Using the converted signal 106, the output layer 107 outputs a signal (hereinafter referred to as a denoise image), in which the noise of the noise removal target image 101 is reduced, as restoration data 108, from which signal deterioration is restored.

The processing circuit 141 inputs signal data (restoration target data 101) and position-related data (sample position data 102) to the learned model by the input function 1411. Specifically, the processing circuit 141 inputs the noise removal target image 101 and the sample position image 102 to the input layer 103. That is the processing circuit 141 inputs the noise removal target image 101 and the sample position image 102 to different channels of the input layer 103. For example, in a case where two sample position images 102 are input to the input layer 103, the input layer 103 has three channels.

FIG. 6 is a diagram illustrating an example of the combination data 104 in the input layer 103 and the output vector 107a generated in the output layer 107. In FIG. 6, the combination data 104 is shown as the input vector. Note that the combination data 104 is not limited to the vector format, and may be, for example, a matrix format. For the sake of concrete explanation, it is assumed that the total number of pixels N (N is a natural number) in the noise removal target image 101 and the sample position image 102 is m×n.

The processing circuit 141 generates the restoration data by using the learned model to which the restoration target data 101 and the sample position data 102 are input by the data restoration function 1413. Specifically, the processing circuit 141 generates the combination data 104 by combining a plurality of pixel values in the noise removal target image 101 and a plurality of pixel values in the sample position image 102 in the input layer 103. Specifically, the processing circuit 141 allocates a plurality of pixel values $(y_1, y_2, \ldots, y_N)$ of the noise removal target image 101 to a first input range 104a in the input vector 104. In addition, the processing circuit 141 allocates a plurality of pixel values $(x_1, x_2, \ldots, x_N)$ of the sample position image 102 to a second input range 104b in the input vector 104.

The processing circuit 141 outputs the input vector 104 to the CNN 105 by the data restoration function 1413. When outputting from the input layer 103 to the CNN 105, the processing circuit 141 performs a convolution process on the input vector 104. The processing circuit 141 recursively performs a convolution process in the CNN 105. The convolution process and the like will be described in detail later with reference to FIG. 7.

The processing circuit 141 holds the signal 106 output from the CNN 105 by the data restoration function 1413 as the vector format 107a indicating pixel values $(z_1, z_2, \ldots, z_N)$ of the denoise image 108 in the output layer 107. The processing circuit 141 generates the denoise image 108 by rearranging a plurality of components in the vector format 107a as the pixels. The processing circuit 141 outputs the denoise image 108 to the memory 117 or the like.

Figure 7:
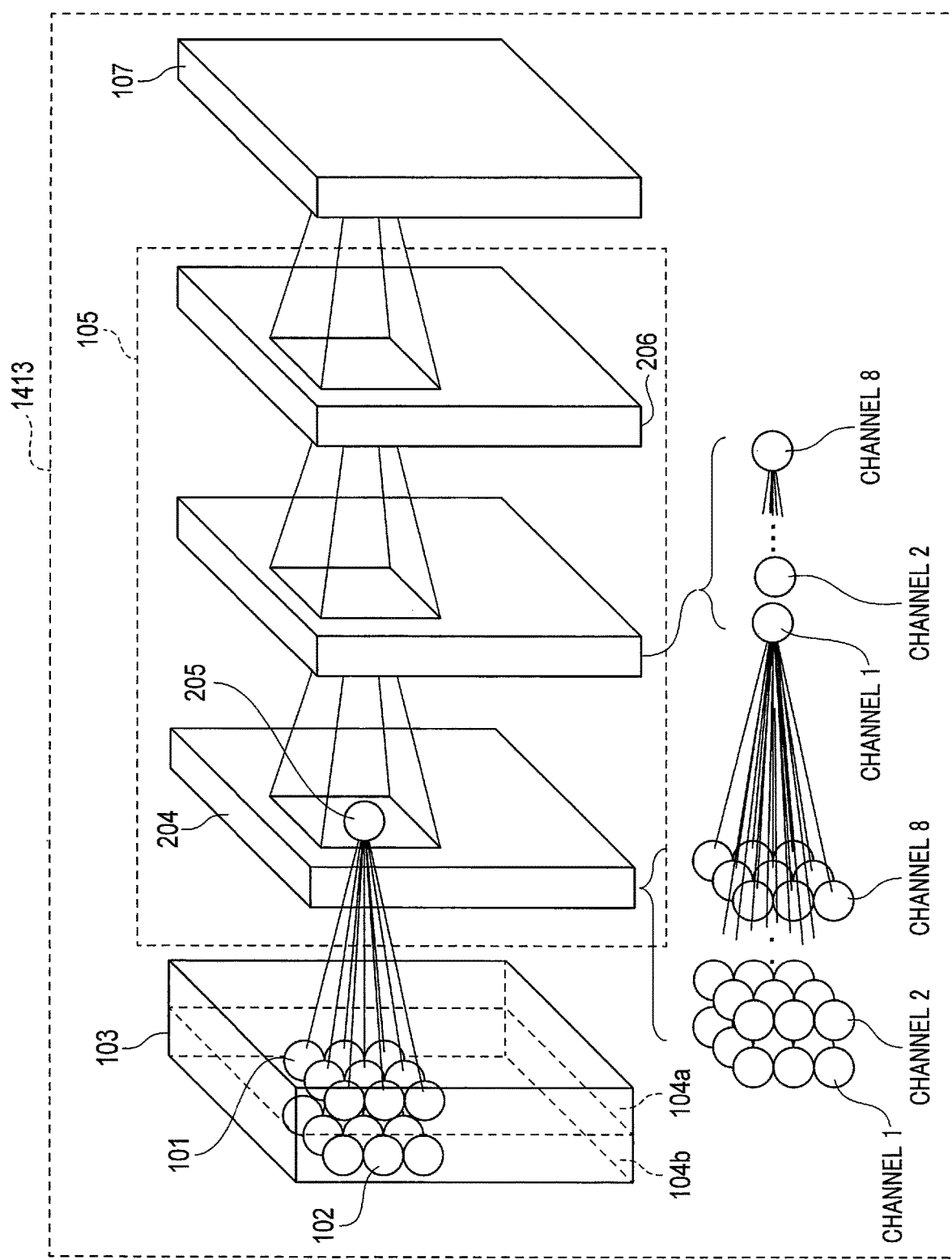
FIG. 7 is a diagram illustrating an example of a configuration of a convolution neural network (CNN) in the present embodiment.

FIG. 7 is a diagram illustrating an example of the configuration of the CNN 105. In FIG. 7, the input layer 103, the CNN 105, the first intermediate layer 204, and the output layer 107 are illustrated as perspective views for convenience of explanation. First, the processing circuit 141 sets the pixel values of the noise removal target image 101 to a plurality of nodes included in the first input range 104a in the input layer 103 by the data restoration function 1413. In addition, the processing circuit 141 sets the pixel values of the sample position image 102 to a plurality of nodes included in the second input range 104b in the input layer 103.

Note that when two sample position images 102 are input to the input layer 103, the input range in the input layer 103 has, for example, a three-layer structure. In FIG. 7, a plurality of nodes other than circles indicating nine nodes in each of the first input range 104a and the second input range 104b are omitted for clarity. The nodes in the first input range 104a and the second input range 104b are prepared by the number of pixels of the noise removal target image 101.

Next, the processing circuit 141 performs a convolution process on the noise removal target image 101 and the sample position image 102 by using a filter having a plurality of learned weighting coefficients by the data restoration function 1413. The processing circuit 141 generates data to be input from the input layer 103 to the first intermediate layer 204 by the convolution process. The total number of weighting coefficients (hereinafter referred to as taps) in the filter is smaller than the number of pixels to which the filter is applied. For example, in the input layer 103 of FIG. 7, the tap is 18 since the number of pixels to which the filter is applied is 3 pixels (horizontal)×3 pixels (vertical)×2 images (noise removal target image 101 and sample position image 102). Note that the tap is not limited to 18 as illustrated in FIG. 7, and may be set as appropriate at the time of learning.

The processing circuit 141 performs a product-sum operation for nine pixels in the noise removal target image 101 and nine pixels in the sample position image 102 by using the filter whose taps have 18 weighting coefficients by the data restoration function 1413. In the first intermediate layer 204, the processing circuit 141 sets the result value (hereinafter referred to as the product-sum value) of the product-sum operation to the node 205 corresponding to the position of the filter used for the product-sum calculation.

The processing circuit 141 sets the product-sum value for all the nodes in the first intermediate layer 204 while changing the application position of the filter to the noise removal target image 101 and the sample position image 102 by the data restoration function 1413. The number of all the nodes in the first intermediate layer 204 is the same as the total number of pixels in the noise removal target image 101 and the sample position image 102. Note that the number of all the nodes may be different from the total number of pixels in the noise removal target image 101 and the sample position image. In addition, the values of the weighting coefficients included in the filter are constant regardless of the positions of the filters applied to the noise removal target image 101 and the sample position image 102.

Figure 8:
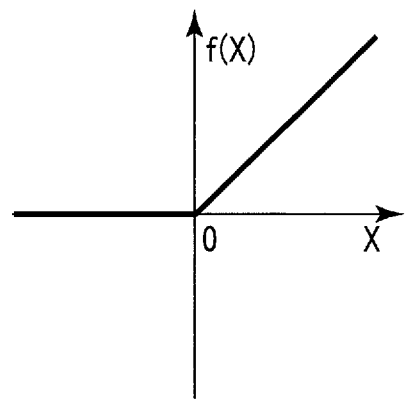
FIG. 8 is a diagram illustrating an example of an activation function according to the present embodiment.

The processing circuit 141 converts (activates) the output result from the filter, that is, the product-sum value X, by using a nonlinear function called an activation function by the data restoration function 1413. FIG. 8 is a diagram illustrating an example of an activation function f(X). The processing circuit 141 uses a rectified linear unit (ReLU) function shown in FIG. 8 as the activation function. The activation function f(X) shown in FIG. 8 is a function that outputs 0 when X≤0 and outputs X when X>0.

Note that the activation function is not limited to the ReLU function, and can be set appropriately at the time of learning by the CNN 105. Note that each of the intermediate layers in the CNN 105 may have a plurality of channels corresponding to the number of images. For example, as illustrated in FIG. 7, when the number of channels in the first intermediate layer 204 is 8, the processing circuit 141 uses eight filters of 3×3×2 taps for each channel in the conversion from the input layer 103 to the first intermediate layer 204. For the eight types of the filters, the weighting coefficients are different. Note that the taps of the filters used in each of the intermediate layers may be different.

Similarly, when the number of channels from the i-th intermediate layer (i is a natural number from 1 to (n−1) and n is the total number of the intermediate layers) to the (i+1)th intermediate layer is 8, the processing circuit 141 repeats image conversion (n−1) times by using eight filters of 3×3×8 taps and the activation function by the data restoration function 1413. For example, as illustrated in FIG. 7, when the total number of intermediate layers is 3, the processing circuit 141 performs the conversion of the product-sum value from the intermediate layer to the intermediate layer twice.

The number of channels of the output layer 107 is set to 1 at the time of learning. For example, in the case illustrated in FIG. 7, the processing circuit 141 performs the product-sum operation by using one filter of the 3×3×8 taps for the product-sum value of eight channels of the third intermediate layer 206 in the output layer 107 by the data restoration function 1413. The processing circuit 141 sets the result (product-sum value) obtained by the product-sum operation to the channels of the output layer 107 as the pixel value without using the activation function. The processing circuit 141 generates the denoise image 108 by using the pixel value set in the output layer 107.

Note that the weighting coefficients in each of the filters used in the CNN 105 are learned by a method called an error back propagation method by using many learning data before implementing the data restoration function 1413. Specifically, the weighting coefficients are learned so that the output image acquired when the image with noise (hereinafter referred to as the noise-containing image) and the sample position image 102 are input is closer to the denoised image. Each of many learning data is generated by, for example, the following procedure. First, the image without noise (hereinafter referred to as the non-noise image) and the sample position image 102 are prepared. Note that a plurality of sample position data 102 may be prepared according to the characteristics of the signal at the time of learning. At this time, among a plurality of learned models respectively corresponding to a plurality of sample position data, the learned model corresponding to the best learning result is stored in the memory 117 together with the sample position data 102 related to the learned model.

The non-noise image is, for example, an image acquired by photographing a subject through exposure for a sufficiently long time. The noise-containing image is, for example, an image acquired by photographing a subject in the time shorter than the photographing time related to the non-noise image. Note that the noise-containing image is generated by adding noise corresponding to the pixel value of the sample position image 102, that is, corresponding to the position of each of the pixels in the non-noise image, to the pixel values of the non-noise image. The non-noise image, the sample position image 102, and the noise-containing image are generated as a set of learning data.

Note that, in addition to the configuration of FIG. 7, the processing circuit 141 in the present embodiment may perform a process called batch normalization after convolution in the intermediate layer by the data restoration function 1413. In addition, the processing circuit 141 may generate the denoise image by outputting the noise image, instead of outputting the denoise image, by the data restoration function 1413, and then subtracting the noise image from the noise removal target image 101. At this time, the weighting coefficients are learned so that the output image at the time of inputting the noise-containing image and the sample position image 102 approaches an image showing noise (hereinafter referred to as a noise image). The noise image corresponds to, for example, an image corresponding to the pixel value of the sample position image 102, that is, an image showing noise corresponding to the position of each of the pixels in the noise image.

According to the processes by the above-described configuration and various functions, the following effects can be obtained.

According to the processing circuit 141 in the signal processing apparatus 1 of the present embodiment, the learned model for generating the restoration data by restoring the signal deterioration based on the data of the signal and the data related to the position of the sample of the signal can be stored, the data of the signal and the data related to the position of the sample can be input to the learned model, and the restoration data can be generated by using the learned model. That is, according to the signal processing apparatus 1, since the sample position image 102 is also input to the input layer 103 in addition to the restoration target data 101, the degree of freedom in which the output changes according to the position of the pixel in the image is generated even with the same weighting factor from the input layer 103 toward the first intermediate layer 204 in the learning of the CNN 105.

Therefore, according to the present embodiment, in a case where the amount of noise is determined according to the position (coordinate value) of the pixel in the noise removal target image 101, it is possible to perform noise removal with an intensity corresponding to the amount of noise for each partial region or pixel of the noise removal target image 101. That is, as compared with the case where only the noise removal target image 101 is input to the input layer 103, even when the amount of noise in the noise removal target image 101 is different in each of the regions of the image, it is possible to reduce noise in the restoration target data 101 with an intensity corresponding to the amount of noise for each partial region in the restoration target data 101.

For example, in a landscape photograph, there are many cases where the upper portion of the landscape photograph is bright in the sky and the lower portion of the landscape photograph is relatively dark. Therefore, noise in the landscape photograph is less in the upper portion and more in the lower portion. As described above, according to the present embodiment, it is possible to adapt to the positional characteristic common to the target image for noise removal (the general landscape photograph in the above example). Note that, according to the present embodiment, not only the characteristic of the noise amount but also, for example, the central portion of the image to be processed as illustrated in FIG. 3 (general image in front of the car in this example) has many fine patterns, and it is possible to cope with the characteristic related to the position of the original image signal, such as the periphery of the central part being flat. That is, the learned model applied to the image to be processed as illustrated in FIG. 3 is learned so as to leave a higher frequency component at the center of the image at the time of noise removal.

From these, according to the signal processing apparatus 1, since not only the restoration target data such as the noise removal target image 101 but also the sample position data 102 indicating the coordinates or the like in each pixel of the image is input to the CNN 105, the signal restoration accuracy can be improved.

Modification Example

A difference between the present application example and the present embodiment is that only the noise removal target image 101 is input to the input layer 103 and the sample position image 102 is input to at least one intermediate layer in the CNN 105. That is, the input layer 103 in the present modification example has only the first input range 104a. In addition, in the present modification example, the intermediate layer to which the sample position image 102 is input has a channel to which the sample position image 102 is input, in addition to a channel to which the product-sum value activated by the activation function is input.

Figure 9:
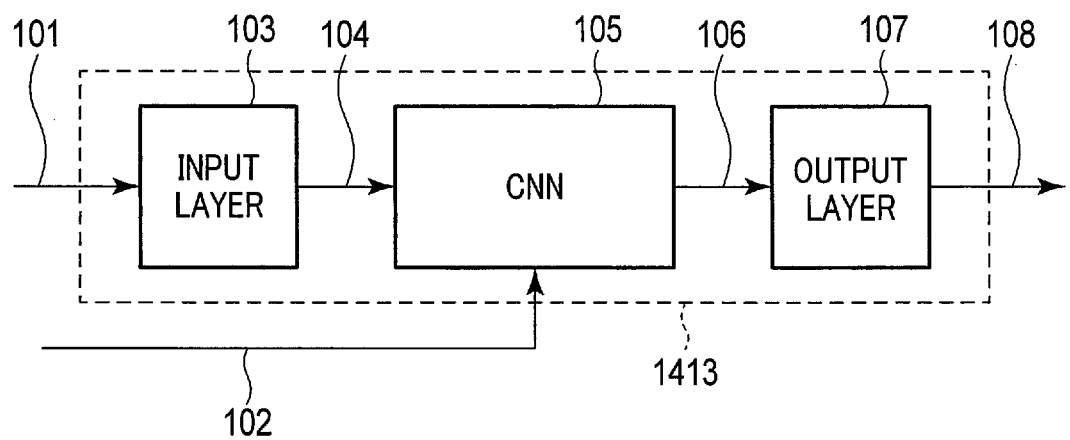
FIG. 9 is a diagram illustrating an example of data input in a modification example of the present embodiment.

FIG. 9 is a diagram illustrating an example of data input in the present modification example. Hereinafter, a process related to the difference between the present modification example and the present embodiment will be described with reference to FIG. 9. Learning for the CNN 105 in the present modification example is the same as the present embodiment, except that the input to the input layer 103 is only the noise removal target image 101 and the input of the sample position image 102 to the CNN 105 is the intermediate layer, and thus a description thereof will be omitted.

The processing circuit 141 inputs the noise removal target image 101 to the input layer 103 by the input function 1411. The processing circuit 141 reads the sample position image 102 from the memory 117 and inputs the read sample position image 102 to the intermediate layer in the CNN 105. For the sake of concrete explanation, it is assumed that the intermediate layer to which the sample position image 102 is input is the first intermediate layer 204. Note that the intermediate layer to which the sample position image 102 is input is not limited to the first intermediate layer 204, and the sample position image 102 may be input to any one of the intermediate layers.

FIG. 10 is a diagram illustrating an example of the first intermediate layer 204 to which the sample position image 102 is input in the present modification example. As illustrated in FIG. 10, the first intermediate layer 204 includes a post-convolution input range 204a to which the convoluted and activated data 2041 is input from the input layer 103, and a sample position input range 204b to which the sample position image 102 is input. A plurality of nodes in the post-convolution input range 204a are the same as a plurality of nodes in the first input range 104a. In addition, a plurality of nodes in the sample position input range 204b are the same as a plurality of nodes in the second input range 104b.

That is, in the modification application example, the first intermediate layer 204 has a channel to which the sample position image 102 is input, in addition to the channel described in the present embodiment. Therefore, the processing circuit 141 performs convolution with a tap with many taps in the channel direction as many added channels, as the output to the second intermediate layer by the data restoration function 1413. For example, referring to FIGS. 7 and 10, the processing circuit 141 performs a convolution process by using a filter of 3×3×9 taps.

Note that the input of the sample position image 102 to the intermediate layer may simply add the pixel value of the sample position image 102 to the data that has been convoluted, without using the channel (the sample position input range 204b in the above example) for the sample position image. That is, the processing circuit 141 may add the value (pixel value) of the sample position image 102 corresponding to each node to the value set in the post-convolution input range 204a by the data restoration function 1413. In addition, in a case where there are two or more channels of post-convolution input ranges 204a, the sample position image 102 may be input to the configuration similar to the input layer 103, and the output increased from one channel may be added to each node and each channel of the post-convolution input range 204a.

Note that the processing circuit 141 may input only the sample position image 102 to another neural network and input an output from another neural network to the sample position input range 204b in the intermediate layer 204. Another neural network inputs, for example, the sample position image 102, includes an input layer separate from the input layer 103 and another intermediate layer, and inputs the output form the another neural network to the intermediate layer 204. Since another added neural network is also connected to the original neural network, it is learned by an error back propagation method at the same time as the original neural network.

According to the above-described configuration, in the present modification example, similarly to the effect of the present embodiment, since the degree of freedom in which the output is changed according to the amount of noise is obtained in the intermediate layer to which the sample position image 102 is input, it is possible to reduce (remove) the noise of the noise removal target image 101 with intensity or characteristics corresponding to the amount of noise for each partial range in the noise removal target image 101.

Hereinafter, the distance measuring apparatus, the voice processing apparatus, and the vibration measuring apparatus each including the processing circuit 141 and the memory 117 in the present embodiment will be respectively described in first to third application examples. The distance measuring apparatus, the voice processing apparatus, and the vibration measuring apparatus are an example of using the one-dimensional restoration target data 101 along the time series and the one-dimensional sample position data 102 for the CNN 105. At this time, as the sample position data 102, for example, the elapsed time from the collection start time of the sample to the collection time, which corresponds to the collection time of the sample in the time-series signal, is used.

First Application Example

The distance measuring apparatus in the present application example mounts the processing circuit 141 and the memory 117 in the present embodiment. In the distance measuring apparatus, for example, optical remote sensing technology such as a light detection and ranging (LIDAR), a light wave distance measuring apparatus, or a radio distance measuring apparatus is used. For example, in a case where the distance measuring apparatus is mounted on a vehicle, the distance measuring apparatus is used for determining the surrounding condition of the vehicle and detecting an obstacle related to the travel of the vehicle.

As the intensity of reflected light (reflected pulse) received by a light receiving element included in the distance measuring apparatus is smaller, or as the disturbance such as environmental light corresponding to noise other than reflected light increases, an error in a distance image generated by the distance measuring apparatus becomes large. Therefore, the accuracy of the distance in the distance image can be improved by setting the reception waveform that is the source of generation of the distance image as the restoration target data 101 and setting the plurality of elapsed times corresponding to the plurality of samples in the reception waveform 101 as the sample position data 102.

Each of the samples in the reception waveform 101 corresponds to the intensity of received light with respect to the time at which reflected light is received by a light receiving element 115 (corresponding to the acquisition time described in the above embodiment, hereinafter referred to as the light reception time). The elapsed time corresponds to the time interval from the collection start time of the reception waveform 101 (for example, the collection starts from the time when the pulse is emitted from the distance measuring apparatus) to the reception time in each of the samples. That is, the position of the sample in the present application example corresponds to the elapsed time.

Figure 11:
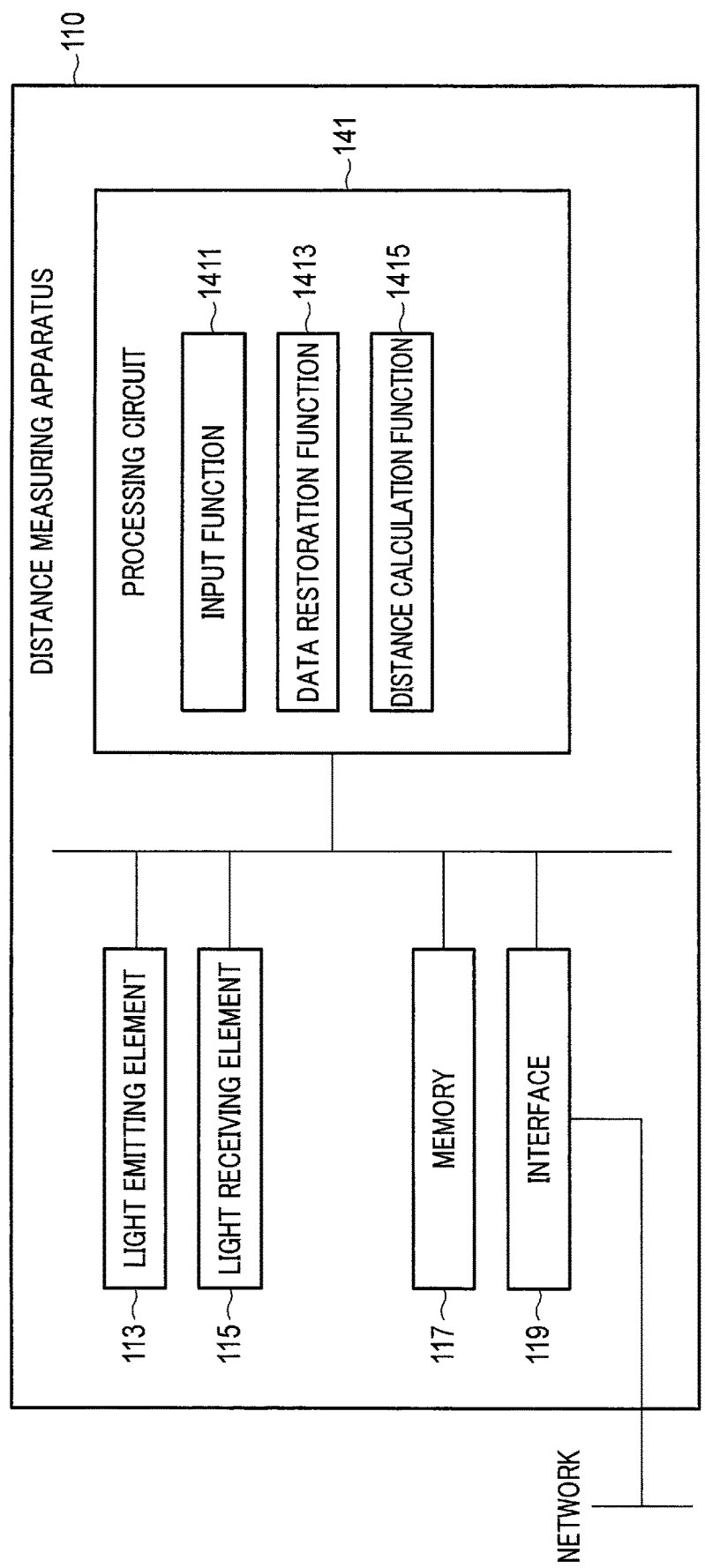
FIG. 11 is a diagram illustrating an example of a configuration of a distance measuring apparatus in a first application example of the present embodiment.

The overall configuration of the distance measuring apparatus 110 in the present application example will be described with reference to FIG. 11. FIG. 11 is a diagram illustrating an example of the configuration of the distance measuring apparatus 110. Note that the following description of the overall configuration is merely an example, and the signal processing apparatus 1 may be mounted on the general distance measuring apparatus 110. As illustrated in FIG. 11, the distance measuring apparatus 110 includes a light emitting element (irradiation unit) 113, a light receiving element (receiving unit) 115, a memory (storage unit) 117, an interface 119, and a processing circuit (processing unit) 141. As illustrated in FIG. 11, the processing circuit 141 has an input function 1411, a data restoration function 1413, and a distance calculation function 1415. The distance measuring apparatus 110 measures the distance to the subject based on the time until laser pulse emitted from the light emitting element 113 toward the subject is reflected from the subject.

In the present application example, the restoration target data 101 corresponds to the reception waveform acquired by the light receiving element 115 before the denoise (data restoration) process by the data restoration function 1413 in FIG. 1. The reception waveform 101 has the intensity of the received light with respect to the light reception time of each of the samples. That is, the reception waveform 101 corresponds to a waveform showing the intensity of the received light along the time series. The intensity of the received light with respect to one light reception time corresponds to one sample in the data to be restored.

In addition, the data amount of the combination data 104 illustrated in FIG. 6 (the data amount (number of samples) of the restoration target data (reception waveform) 101 and the data amount (number of samples) of the sample position data 102) is predefined according to the target region for distance measurement using the light emitting element 113 and the light receiving element 115 (hereinafter referred to as measurement target region) and the upper limit of distance to be measured (hereinafter referred to as measurement upper limit). That is, the CNN 105 is learned according to the measurement target region and the measurement upper limit. Note that the data amount of the combination data 104 may be defined by the measurement time of the reception signal instead of the number of samples. At this time, the reception waveform 101 acquired in the measurement time corresponding to each of a plurality of laser pulses emitted from the light emitting element 113 in the measurement target region is input to the CNN 105.

Processing contents related to the present application example can be understood by replacing the noise removal target image 101 in the embodiment with the reception waveform, and thus descriptions thereof will be omitted. In addition, in the present application example, since the data restoration function 1413 aims to remove the noise in the reception waveform 101, that is, the reception intensity caused by environmental light, the data restoration function 1413 corresponds to the noise removal function for removing the noise in the reception waveform 101. In the present application example, the data restoration function 1413 and the distance calculation function 1415 of the processing circuit 141 are examples of the noise removal unit and the distance calculation unit, respectively.

The light emitting element 113 corresponds to, for example, a laser diode. The light emitting element 113 generates laser light as emitted light according to a reference timing signal generated by a reference timing generation circuit (not illustrated). Therefore, the light emitting element 113 successively emits (irradiates) the laser light toward the obstacle in the measurement target region. Note that the light emitting element 113 is not limited to the laser diode, and may be realized by a light wave generator that generates a light wave having an arbitrary wavelength.

The light receiving element 115 includes, for example, at least one light detecting element such as a photodiode and an A/D converter. The light receiving element 115 receives reflected light and converts the received reflected light into an electric signal (hereinafter referred to as a reception signal) according to the intensity of the reflected light. In the reception waveform 101, in addition to the laser pulse reflected from the object, reception signals due to environmental light other than this pulse coexist. The light receiving element 115 outputs the reception signal to the processing circuit 141 together with the reception time of the reflected light. Specifically, the light receiving element 115 receives the reflected light including the laser pulse reflected from the object by the light detecting element. The light receiving element 115 converts the received reflected light into the reception signal by the A/D converter.

More specifically, the light receiving element 115 detects a temporal change in the intensity of the reflected light, and outputs a time-series reception signal (reception waveform 101) digitized by A/D conversion to the processing circuit 141. That is, the light receiving element 115 samples the reception signal according to the sampling frequency by A/D conversion, and outputs the digital reception waveform 101 to the processing circuit 141. Each of a plurality of values in the reception waveform 101 (intensity of reception waveform) as the digital data corresponds to the above-described sample in the reception waveform 101.

More specifically, the light receiving element 115 outputs, to the processing circuit 141, the reception waveform 101 acquired by scanning the measurement target region by using the laser pulse generated by the light emitting element 113. At this time, the reception waveform 101 is input to the first input range 104a of the input layer 103 under the control of the input function 1411. Note that the light receiving element 115 may output the converted reception waveform 101 to the memory 117 together with the reception time until the scan using the laser pulse with respect to the measurement target region is completed.

The memory 117 stores the data 101 of the reception signal indicating the reception waveform and the data sample position data 102 related to the position of the sample in the reception signal. In addition, the memory 117 stores the learned model for generating noise removal data in which the noise of the reception signal is reduced, based on the data of the reception signal and the data related to the position of the sample of the reception signal. The noise removal data corresponds to the restoration data 108 in FIG. 6 or the like.

The memory 117 stores the noise removal data corresponding to the restoration data 108. The noise removal data corresponds to the restoration waveform 108 acquired by restoring the reception waveform 101 from noise deterioration by the data restoration function 1413. The memory 117 stores the distance calculated by using the noise removal data 108 by the distance calculation function 1415. Note that the memory 117 may store a distance image in which a gray scale corresponding to the calculated distance is arranged by the distance calculation function 1415 across the measurement target region. The memory 117 stores programs corresponding to various functions to be executed in the processing circuit 141. For example, the memory 117 stores a program (hereinafter referred to as a data restoration program) for performing the CNN 105 corresponding to the above-described learned model.

An interface 119 corresponds to a circuit or the like related to input and output with respect to the distance measuring apparatus 110. The interface 119 receives an input instruction from an operator. In addition, the interface 119 receives various instructions or information inputs from an external device via a wireless or wired network. In addition, the interface 119 may output the distance image generated by the distance calculation function 1415 to the external device or the like via the wireless or wired network. For example, regarding the external device, when the distance measuring apparatus 110 is mounted on the vehicle, the interface 119 outputs the distance image to the control circuit or the like in the vehicle. Note that the interface 119 includes a display (not illustrated) and may be realized as a user interface. At this time, the processing circuit 141 displays the distance image on the display.

The processing circuit 141 controls the distance measuring apparatus 110 by a system control function (not illustrated). Various functions executed by the input function 1411, the data restoration function 1413, and the distance calculation function 1415 are stored in the memory 117 in the form of programs that are executable by a computer. The processing circuit 141 is a processor that realizes functions corresponding to the respective programs by reading programs corresponding to these various functions from the memory 117 and executing the read programs. In other words, the processing circuit 141 in a state in which each program is read has a plurality of functions illustrated in the processing circuit 141 of FIG. 11.

In FIG. 11, it has been described that these various functions are realized by the single processing circuit 141. However, the functions are realized in such a manner that the processing circuit 141 is configured by combining a plurality of independent processors and each processor executes the program. In other words, each of the above-described functions may be configured as a program and one processing circuit may execute each program, or a specific function may be implemented in a dedicated independent program execution circuit.

The processing circuit 141 calculates the distance by the distance calculation function 1415 based on the light reception time corresponding to the maximum intensity of the pulse in the restoration waveform 108 output from the data restoration function 1413 (hereinafter referred to as the pulse time) and the reference timing signal. Specifically, the processing circuit 141 detects the pulse in the restoration waveform 108 and specifies the pulse time corresponding to the detected pulse. Next, the processing circuit 141 calculates the distance to the obstacle by dividing a multiplied value by 2, the multiplied value being obtained by multiplying a difference between the generation time of the laser light in the light emitting element 113 and the pulse time by a light speed. The multiplied value is divided by 2 because the laser pulse generated by the light emitting element 113 reciprocates between the distance measuring apparatus 110 and the obstacle. Note that the processing circuit 141 may generate the distance image by arranging the calculated distance for each pixel.

The overall configuration of the distance measuring apparatus 110 in the present application example has been described. Hereinafter, the input function 1411 and the data restoration function 1413 in the present application example will be described in detail in the following description of the data restoration process. In the present application example, the restoration target data 101 is one-dimensional data along the time series, not two-dimensional image described in the above embodiment. The CNN 105 in the data restoration process can be understood by replacing two-dimensional data with one-dimensional data in FIG. 7. That is, the processing circuit 141 uses the input function 1411 to set the noise removal target as the one-dimensional reception waveform 101 along the time series instead of the two-dimensional image data and set the sample position image 1 as the one-dimensional sample position data 102, and inputs them to the input layer 103. In this case, the number of channels in the input layer 103, the plurality of intermediate layers, and the output layer 107 with respect to the CNN 105 is the number of one-dimensional channels instead of the number of two-dimensional channels.

(Data Restoration Process)

The data restoration process in the present application example is a process of generating the noise removal data 108 as the restoration data by executing the data restoration program using the data 101 of the reception signal and the data 102 related to the position of the sample of the reception signal. FIG. 12 is a flowchart showing an example of a procedure related to the data restoration process in the present application example.

(Step Sa1)

Figure 13:
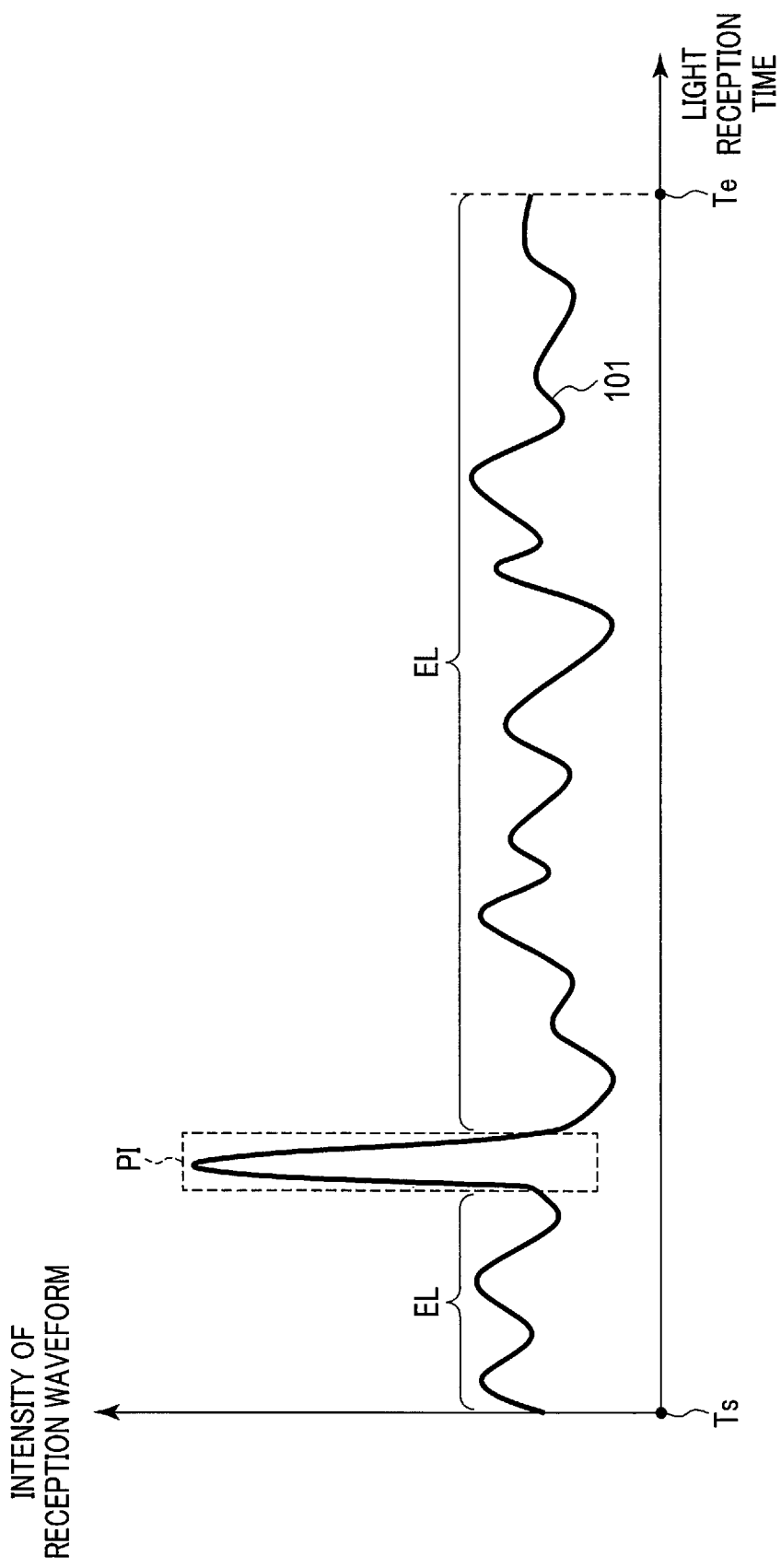
FIG. 13 is a diagram illustrating an example of a reception waveform in a case where a distance measuring apparatus and an object to be measured are close in distance in the first application example of the present embodiment.

The light receiving element 115 receives the reflected light from the object along the time series. Therefore, the reception waveform 101 along the time series related to the reflected light is acquired. FIG. 13 is a diagram illustrating an example of the reception waveform 101 in a case where the distance measuring apparatus 110 and the object to be measured are close in distance. In FIG. 13, the reflected light in the reception waveform 101 is shown as pulse PI. EL shown in FIG. 13 shows a part of the reception waveform 101 related to environmental light.

As illustrated in FIG. 13, in a case where the distance between the distance measuring apparatus 110 and the object to be measured is short, the pulse emitted from the light emitting element 113 is diffused and reflected from the object and returned to the light receiving element 115 in a relatively short time. Thus, the elapsed time for the pulse PI becomes short. In addition, since the pulse emitted from the light emitting element 113 is returned to the light receiving element 115 in a relatively short time, the attenuation of the pulse becomes small as compared with a case where the distance measuring apparatus 110 and the object to be measured are distant from each other. Therefore, in a case where the distance between the distance measuring apparatus 110 and the object to be measured is short, the wave height of the pulse PI, that is, the intensity (voltage or the like) of the pulse PI is larger than the intensity of the environmental light EL.

Figure 14:
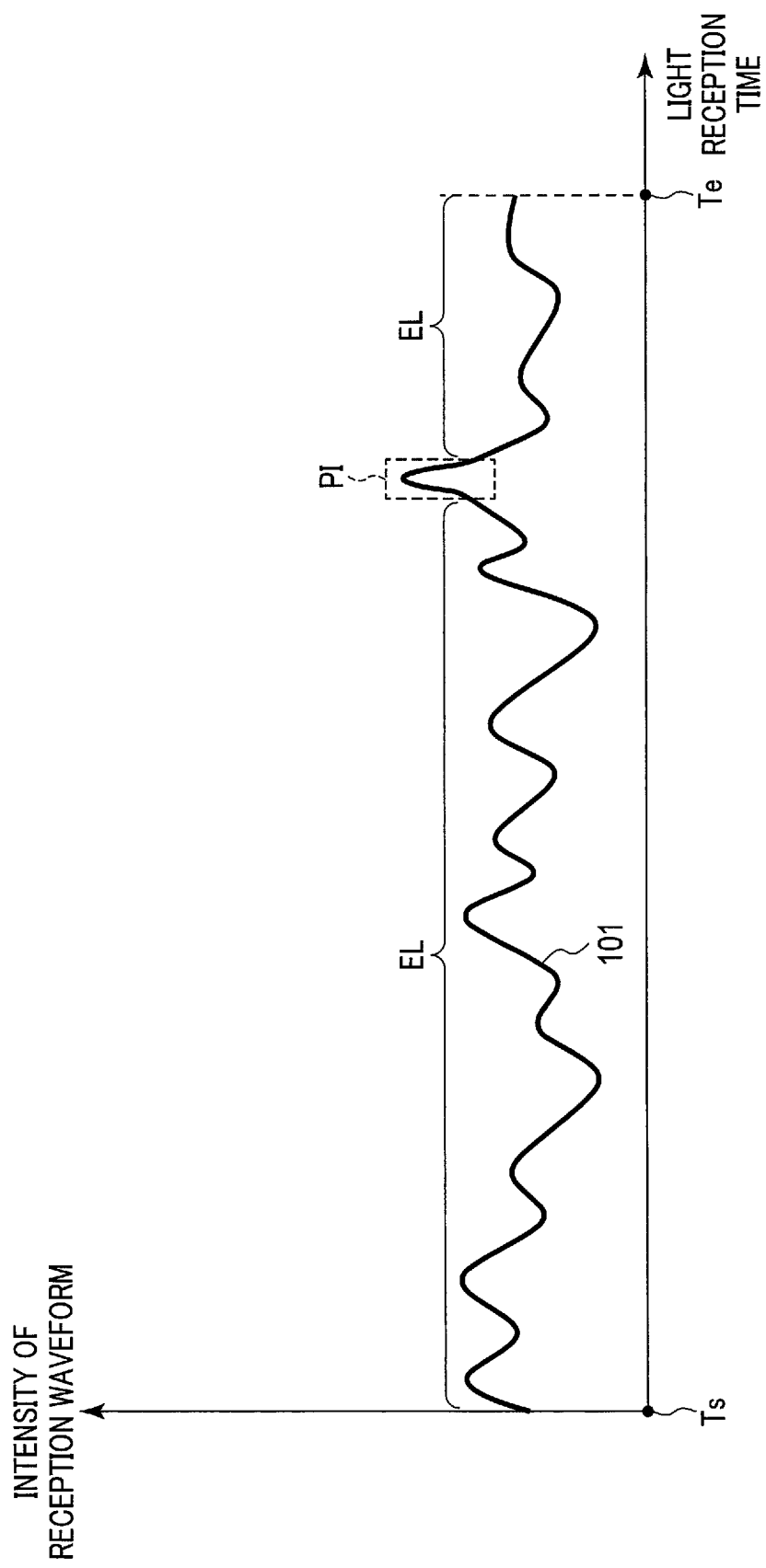
FIG. 14 is a diagram illustrating an example of a reception waveform in a case where a distance measuring apparatus and an object to be measured are distant from each other in the first application example of the present embodiment.

FIG. 14 is a diagram illustrating an example of the reception waveform 101 in a case where the distance between the distance measuring apparatus 110 and the object to be measured is long. In FIG. 14, the reflected light in the reception waveform 101 is shown as pulse PI. EL shown in FIG. 14 shows a part of the reception waveform 101 related to environmental light. In a case where the distance measuring apparatus 110 and the object to be measured is distant from each other, since the pulse emitted from the light emitting element 113 is reflected from the object and returned to the light receiving element 115 in a relatively long time. Thus, the elapsed time for the pulse PI becomes long. At this time, the attenuation of the reflected light becomes large as compared with a case where the distance measuring apparatus 110 and the object to be measured are close in distance, and the wave height of the pulse PI in the reception waveform 101 shown in FIG. 14, that is, the intensity (voltage or the like) of the pulse PI is lower than the wave height of the pulse in a case where the distance between the distance measuring apparatus 110 and the object to be measured is short.

In addition, as illustrated in FIGS. 13 and 14, the wave height of the environmental light EL in the reception waveform 101 is substantially constant regardless of the elapsed time. As illustrated in FIGS. 13 and 14, the wave height of the pulse PI in the reception waveform 101 increases as the elapsed time is short and decreases as the elapsed time is long. Thus, the wave height of the pulse PI in the reception waveform 101 has characteristics according to the elapsed time (time-of-flight) caused by the attenuation of the reflected light. In FIGS. 13 and 14, the collection start time is indicated by Ts, and the collection end time of the sample is indicated by Te. The time from the collection start time Ts to the collection end time Te of the sample corresponds to the above-described measurement time and is set in advance according to the measurement upper limit.

(Step Sa2)

The processing circuit 141 reads the sample position data 102 related to the position (elapsed time) of the sample of the reception signal (reception waveform) 101 from the memory 117 by the input function 1411. Note that the reading of the sample position data 102 may be performed before the process of step Sa1.

FIG. 15 is a diagram illustrating an example of the sample position data 102. As illustrated in FIG. 15, when the sample position data 102 indicate the elapsed time with respect to the light reception time, the sample position data 102 in the present application example is linear data which monotonically increases over the measurement time. Note that a value obtained by normalizing the elapsed time to 0 to 1 over the measurement time may be used as the sample position data 102. In addition, the sample position data 102 is not limited to the monotonically increasing linear data, and may be monotonically decreasing linear data. The sample position data 102 is not limited to linear, and may be nonlinear data corresponding one-to-one to the light reception time.

More generally, the sample position data 102 is not limited to the correspondence relationship between the elapsed time and the position of the sample that is the reception time, and the sample position data 102 may be any functional form regardless of whether it is linear or nonlinear as long as it is one-to-one correspondence data in which different values are set with respect to the position of the sample. For example, the sample position data 102 may be data corresponding to a correspondence table having a plurality of different index values (label values) respectively corresponding to positions of a plurality of samples. At this time, it is preferable that the different indices are those continuously changing with respect to the reception time and are those in which the number of digits of the labels does not change so much (for example, 0 to 3 digits).

(Step Sa3)

The processing circuit 141 inputs the reception waveform 101 as the data of the reception signal and the sample position data 102 to the learned model by the input function 1411. More specifically, the processing circuit 141 inputs the reception waveform 101 and the sample position data 102 to the input layer 103. More specifically, the processing circuit 141 inputs the intensity of each of the samples in the reception waveform 101, which is acquired in step Sa1, to a plurality of nodes in the first input range 104a of the input layer 103. The processing circuit 141 inputs a plurality of values of the sample position data 102, which is read in step Sa2, to a plurality of nodes in the second input range 104b of the input layer 103.

The processing circuit 141 generates the combination data 104 by combining the intensity of each of the samples in the reception waveform 101 and the values of the sample position data 102 in the input layer 103 by the data restoration function 1413. The processing circuit 141 outputs the combination data to the CNN 105.

Note that in a case where the above-described modification example is used in the present application example, the processing circuit 141 inputs the reception waveform 101 to the input layer 103 and inputs the sample position data 102 to at least one intermediate layer of the CNN 105.

Figure 16:
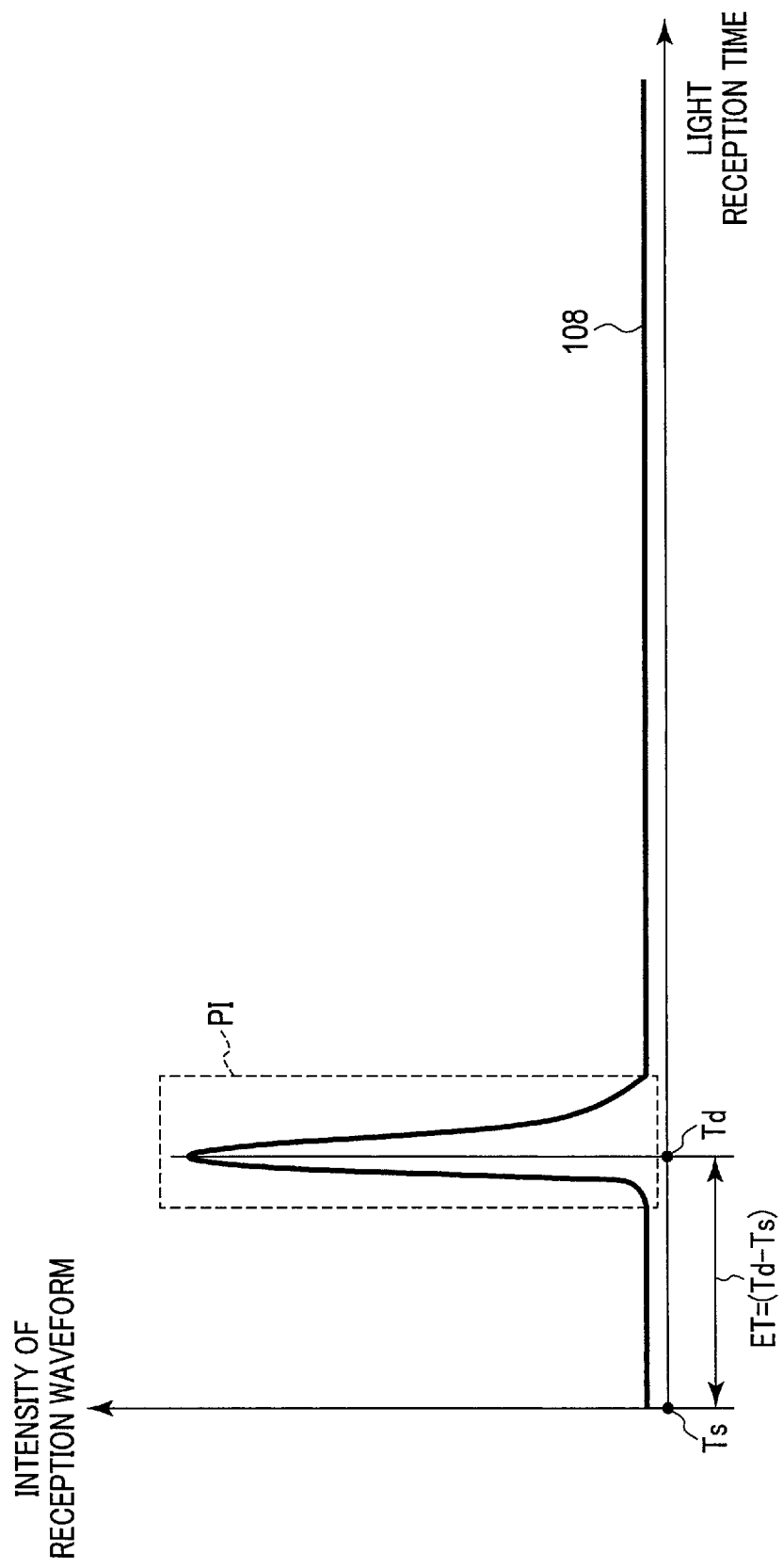
FIG. 16 is a diagram illustrating an example of a restoration waveform in a case where a distance measuring apparatus and an object to be measured are close in distance in the first application example of the present embodiment.
Figure 17:
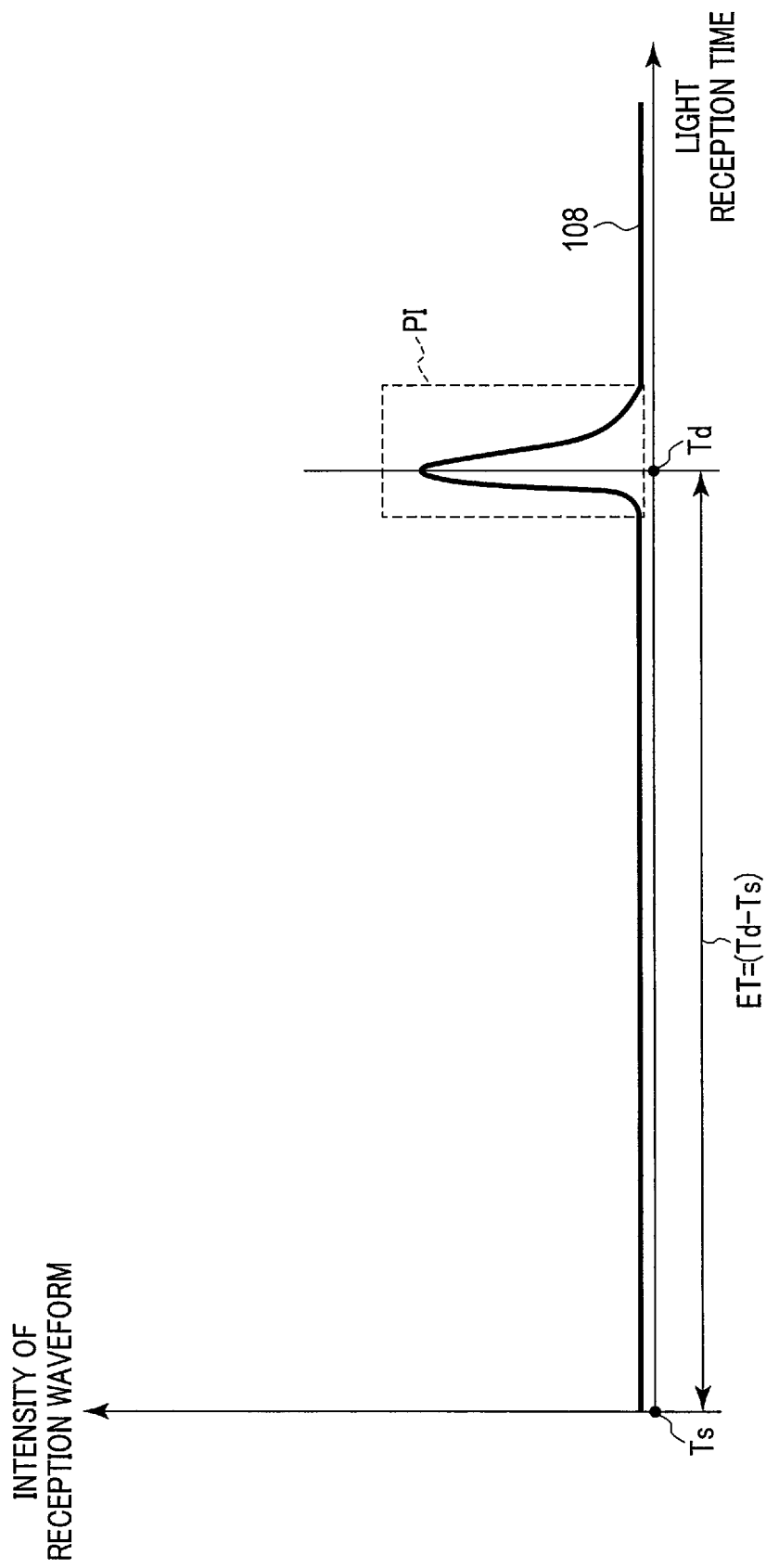
FIG. 17 is a diagram illustrating an example of a restoration waveform in a case where a distance measuring apparatus and an object to be measured are distant from each other in the first application example of the present embodiment.

The processing circuit 141 generates the noise removal data (restoration waveform) 108, from which the noise (influence of the environmental light) of the reception signal is reduced or removed, by using the learned model to which the reception waveform 101 and the sample position data 102 are input by the data restoration function 1413. FIG. 16 is a diagram illustrating an example of the restoration waveform 108 in a case where the distance measuring apparatus 110 and the object to be measured are close in distance. FIG. 17 is a diagram illustrating an example of the restoration waveform 108 in a case where the distance measuring apparatus 110 and the object to be measured are distant in distance. As illustrated in FIGS. 16 and 17, in the restoration waveform 108, the influence of the environmental light EL on the reception waveform 101 is reduced or removed.

(Step Sa4)

The processing circuit 141 detects a pulse in the restoration data (restoration waveform) 108 output from the learned model by the distance calculation function 1415. Specifically, the processing circuit 141 specifies the light reception time (pulse time) of the detected pulse. Td in FIGS. 16 and 17 indicates the specified pulse time with respect to the detected pulse PI.

(Step Sa5)

The processing circuit 141 calculates the distance corresponding to the pulse by using the elapsed time related to the detected pulse by the distance calculation function 1415. Specifically, the processing circuit 141 calculates the elapsed time related to the detected pulse. In FIGS. 16 and 17, the elapsed time ET is calculated by subtracting the emission time of the pulse from the specified pulse time Td, that is, the collection start time Ts of the sample. The processing circuit 141 calculates the distance by multiplying the elapsed time ET (=Td−Ts) by the light speed c and dividing the result by 2 (ET×c/2).

The processes of steps Sa1 to Sa5 are the flow of the process at one point in the measurement target region. Therefore, the processes of steps Sa1 to Sa5 are repeated over the entire measurement target region. In each of the repetitive processes, the same sample position data 102 is input to the CNN 105. When a plurality of distances related to the entire measurement target region are calculated, the processing circuit 141 may generate the distance image by using the distance calculated for each light detecting element by the distance calculation function 1415.

According to the processes by the above-described configuration and various functions, the following effects can be obtained.

According to the distance measuring apparatus 110 in the present application example, it is possible to receive the reflected light including the pulse reflected from the object, to convert the received reflected light into the reception signal, to input the data 101 of the reception signal and the data 102 related to the position of the sample of the reception signal to the learned model for generating noise removal data in which the noise of the reception signal is reduced based on the data 101 of the reception signal and the data 102 related to the position of the sample of the reception signal, to generate the noise removal data 108 by using the learned model, to detect the pulse in the noise removal data 108, and to calculate the distance of the object based on the detected pulse.

In addition, according to the distance measuring apparatus 110, it is possible to input the reception waveform 101 and the sample position data 102 to different channels of the input layer 103 in the neural network as the learned model. In addition, according to the distance measuring apparatus 110, the reception waveform 101 is input to the input layer 103 in the neural network as the learned model and the sample position data 102 is input to at least one of the intermediate layers in the neural network.

From the above, according to the distance measuring apparatus 110 of the present application example, even if the intensity of the reflected light is small or there are many disturbances such as environmental light other than the reflected light, the error in the distance image can be reduced, and the accuracy of the distance in the distance image can be improved. That is, according to the distance measuring apparatus 110 of the present application example, since it is possible to adapt to characteristics corresponding to the elapsed time in the reception waveform 101, it is possible to effectively remove environmental light in the reception waveform 101 as noise. That is, according to the distance measuring apparatus 110, even when the distance between the distance measuring apparatus 110 and the object to be measured is long, the pulses buried in the reception waveform 101 as illustrated in FIG. 14 can be detected as illustrated in FIG. 17. From these, according to the distance measuring apparatus 110, since the reception time of the pulse can be detected with high accuracy, the measurement accuracy of the distance can be improved.

Second Application Example

Figure 18:
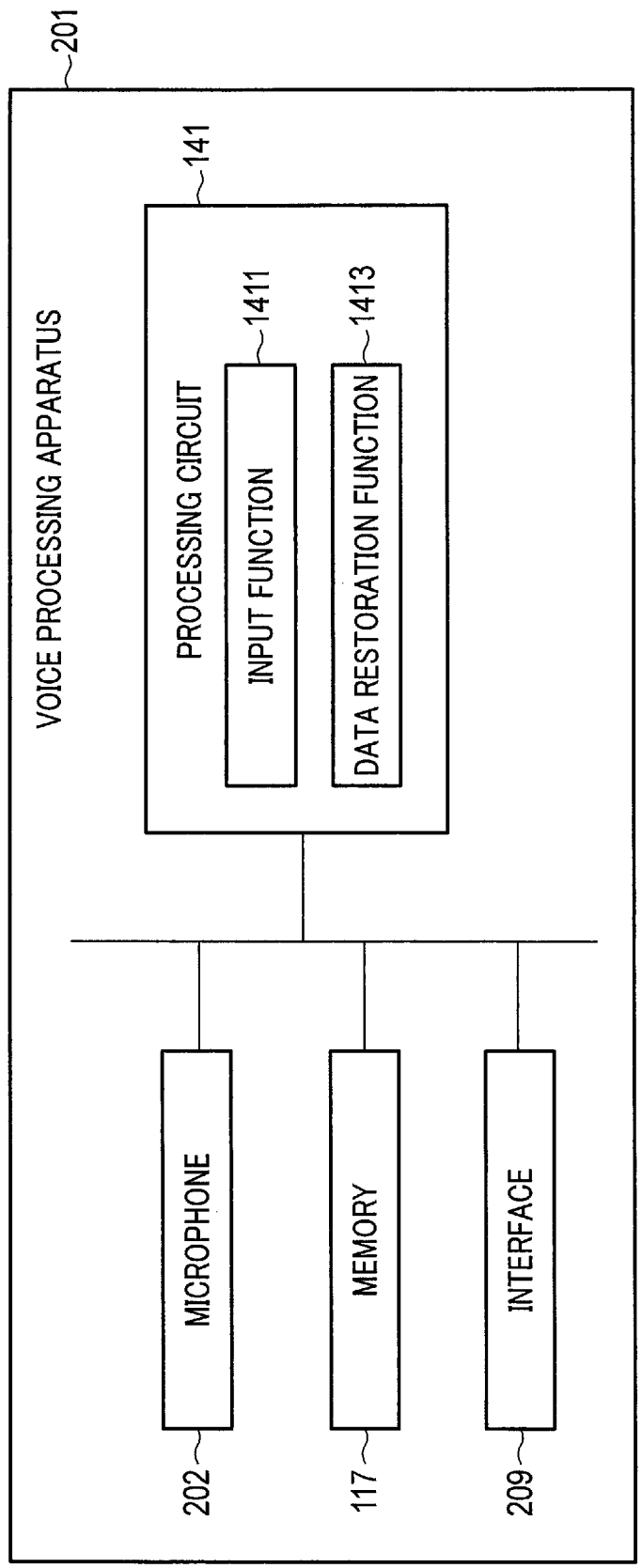
FIG. 18 is a diagram illustrating an example of a configuration of a voice processing apparatus in a second application example of the present embodiment.

The voice processing apparatus in the present application example mounts the processing circuit 141 and the memory 117 in the present embodiment. The overall configuration of the voice processing apparatus 201 in the present application example will be described with reference to FIG. 18. FIG. 18 is a diagram illustrating an example of the configuration of the voice processing apparatus 201. As illustrated in FIG. 18, the voice processing apparatus 201 includes a microphone 202, a memory (storage unit) 117, an interface 209, and a processing circuit (processing unit) 141. The processing circuit 141 has an input function 1411 and a data restoration function 1413 as in FIG. 1. The microphone 202 is an example of a voice acquisition unit that acquires voices in time series.

In the present application example, the restoration target data 101 corresponds to voice data (voice signal) acquired along the time series by the microphone 202. The voice data is an example of one-dimensional data along the time series. The sample position data 102 is data related to the position of the sample in the voice data, that is, the elapsed time with respect to the collection time of each of the samples, and corresponds to data illustrated in FIG. 15. Specifically, the sample position data 102 is data having time-related characteristics with respect to a voice signal in a voice operation by a fixed word. The restoration data 108 output from the output layer 107 is voice data in which environmental sound is reduced or removed. In other words, as the application example of the voice processing apparatus 201, since the time-related characteristics are in the voice signal in the voice operation by the fixed word, it is possible to effectively remove the environmental sounds other than the speaking person in the voice data, thereby improving the voice recognition rate. In the present application example, since the contents of process related to the above-described application example can be understood by replacing the restoration target data 101 with voice data, descriptions thereof will be omitted.

The microphone 202 is, for example, a close-talking microphone. The microphone 202 acquires the voice of the speaking person. In addition, the microphone 202 may be a microphone having directivity. The microphone 202 generates voice data according to the voice acquired along the time series. The microphone 202 outputs the voice data to the processing circuit 141.

The memory 117 stores voice data, sample position data 102, and voice data (hereinafter referred to as "noise data") in which noise (environmental sound) in the voice data has been reduced by the data restoration function 1413. The denoise data corresponds to the restoration data 108 of FIG. 6 or the like. The memory 117 stores the learned model for generating denoise data in which the noise of the voice data 101 is reduced along the time series based on the voice data 101 and the sample position data 102. The memory 117 stores programs corresponding to various functions to be executed in the processing circuit 141. For example, the memory 117 stores a data restoration program for performing the CNN 105 corresponding to the above-described learned model.

An interface 209 corresponds to a circuit or the like related to input and output with respect to the voice processing apparatus 201. The interface 209 receives an input instruction from an operator. In addition, the interface 209 receives various instructions or information inputs from an external device via a wireless or wired network. In addition, the interface 209 outputs the denoise data 108 generated by the data restoration function 1413 to the external device or the like via the wireless or wired network. Note that the interface 209 has a speaker (not illustrated) and may generate a voice corresponding to the denoise data 108 according to an instruction from the operator.

The processing circuit 141 controls the voice processing apparatus 201 by a system control function (not illustrated). Various functions executed by the input function 1411 and the data restoration function 1413 are stored in the memory 117 in the form of programs that are executable by a computer. The processing circuit 141 is a processor that realizes functions corresponding to the respective programs by reading programs corresponding to these various functions from the memory 117 and executing the read programs. In other words, the processing circuit 141 in a state in which each program is read has a plurality of functions illustrated in the processing circuit 141 of FIG. 18.

In FIG. 18, it has been described that these various functions are realized by the single processing circuit 141. However, the functions are realized in such a manner that the processing circuit 141 is configured by combining a plurality of independent processors and each processor executes the program. In other words, each of the above-described functions may be configured as a program and one processing circuit may execute each program, or a specific function may be implemented in a dedicated independent program execution circuit.

The overall configuration of the voice processing apparatus 201 in the present application example has been described. Hereinafter, the input function 1411 and the data restoration function 1413 in the present application example will be described in detail in the following description of the data restoration process.

(Data Restoration Process)

The data restoration process in the present application example is a process of generating the restoration data 108 by executing the data restoration program using the voice data 101 and the sample position data 102. FIG. 19 is a flowchart showing an example of a procedure related to the data restoration process in the present application example.

(Step Sb1)

The microphone 202 acquires the voice data 101 along the time series. FIG. 20 is a diagram illustrating an example of the voice data 101. As illustrated in FIG. 20, sawtooth-shaped noise appears in the voice data 101. Since the data amount of the combination data 104 is finite, the acquisition period of the voice data 101 is preset according to the amount of data in the first input range 104a of the input layer 103.

(Step Sb2)

The processing circuit 141 reads the sample position data 102 related to the position (elapsed time) of the sample in the sound data (sound waveform) 101 from the memory 117 by the input function 1411. Note that the reading of the sample position data 102 may be performed before the process of step Sb1.

(Step Sb3)

The voice data 101 and the sample position data 102 are input to the learned model. More specifically, the processing circuit 141 inputs the voice data 101 and the sample position data 102 to the input layer 103 by the input function 1411. More specifically, the processing circuit 141 inputs the amplitude value of the voice along the time series in the voice data 101 to a plurality of nodes in the first input range 104a of the input layer 103. The processing circuit 141 inputs a plurality of values along the time series in the sample position data 102 to a plurality of nodes in the second input range 104b of the input layer 103.

The processing circuit 141 generates the combination data 104 by combining the amplitude values of the voice data 101 and the values of the sample position data 102 in the input layer 103 by the data restoration function 1413. The processing circuit 141 outputs the combination data to the CNN 105. Note that in a case where the above-described modification example is used in the present application example, the processing circuit 141 inputs the voice data 101 to the input layer 103 and inputs the sample position data 102 to at least one intermediate layer of the CNN 105.

(Step Sb4)

The processing circuit 141 generates the denoise data 108, from which the noise (influence of the environmental sound) of the voice data 101 is reduced or removed, by using the learned model to which the voice data 101 and the sample position data 102 are input by the data restoration function 1413. Specifically, the processing circuit 141 generates the denoise data 108 by using the CNN 105 by executing the data restoration program using the voice data 101 and the sample position data 102 by the data restoration function 1413.

FIG. 21 is a diagram illustrating an example of the denoise data 108 along the time series. As illustrated in FIG. 21, sawtooth-shaped noise is reduced as compared with FIG. 20. The processing circuit 141 outputs the denoise data 108 to the interface 209. Note that the interface 209 may output the denoise data 108 as the voice from the speaker according to an instruction from the operator. The processes of steps Sb1 to Sb4 are repeated according to the acquisition of the voice data. In each of the repetitive processes, the same sample position data 102 is input to the CNN 105.

According to the processes by the above-described configuration and various functions, the following effects can be obtained.

According to the voice processing apparatus 201 in the present application example, it is possible to acquire the voice along the time series, to store the learned model for generating denoise data 108, in which the noise of the voice is reduced along the time series, based on the voice data 101 and the sampling position data 102 having time-related characteristics with respect to the acquired voice, to input the voice data 101 and the sample position data 102 to the learned model, and to generate the denoise data 108 by using the learned model.

From the above, according to the voice processing apparatus 201 of the present application example, in the voice recognition having characteristics related to the elapsed time from the time when the speech such as voice operation is started, for example, the voice recognition accuracy can be improved by reducing or removing the surrounding sounds other than the speaking person as noise. That is, according to the voice processing apparatus 201, as in the two-dimensional signal like the image described in the present embodiment, the one-dimensional voice signal along the time series can construct the neural network using the filter and the activation function.

Therefore, according to the voice processing apparatus 201, for example, it is possible to effectively reduce the background sound in the voice data 101 by setting the voice signal (voice data) 101 including the time-series noise and the sample position data 102 having the same time series, for example, time characteristics, in the input layer 103. From these, according to the voice processing apparatus 201, even in voice operation by the fixed word, since the voice signal has time-related characteristics, it is possible to effectively remove the environmental sounds other than the speaking person in the voice data 101 and to improve the voice recognition rate.

Third Application Example

Figure 22:
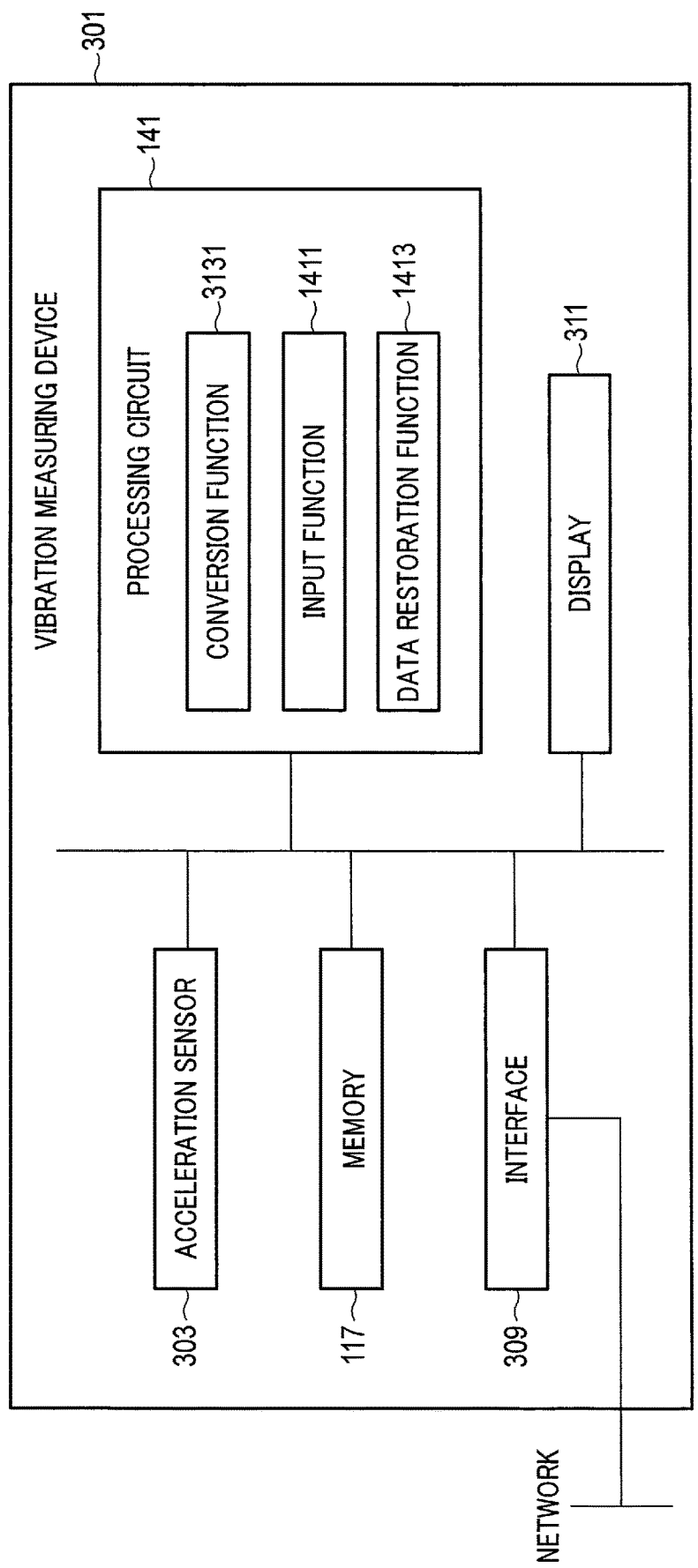
FIG. 22 is a diagram illustrating an example of a configuration of a vibration measuring apparatus in a third application example of the present embodiment.

The vibration measuring apparatus of the present application example mounts the processing circuit 141 and the memory 117 in the present embodiment. The vibration measuring apparatus is used in non-destructive inspection for structures (bridges, buildings, dams, or the like). For example, the vibration measuring apparatus is used for crack detection such as cracks in these structures. The overall configuration of the vibration measuring apparatus 301 in the present application example will be described with reference to FIG. 22. FIG. 22 is a diagram illustrating an example of the configuration of the vibration measuring apparatus 301. As illustrated in FIG. 22, the vibration measuring apparatus 301 includes an acceleration sensor 303, a memory (storage unit) 117, an interface 309, a display 311, and a processing circuit (processing unit) 141. In addition to a conversion function 3131, the processing circuit 141 has an input function 1411 and a data restoration function 1413 as in FIG. 1. The acceleration sensor 303 is an example of a vibration measuring unit that measures vibration along the time series.

In the present application example, restoration target data 101 corresponds to data (hereinafter referred to as conversion data) in which Fourier transformation is performed on data of vibration (hereinafter referred to as vibration data) acquired along the time series by the acceleration sensor 303. In addition, since the conversion data 101 is based on vibration data indicating acceleration, the conversion data 101 generally has high intensity in low frequency components. That is, in the conversion data 101 indicating the frequency spectrum of the vibration data, the low frequency component is more than the high frequency component. Therefore, the sample position data 102 is, for example, data related to the position (frequency) of the sample in the conversion data 101, and corresponds to, for example, the frequency spectrum in which the intensity decreases monotonously with respect to frequency from low frequency components to high frequency components.

Note that the sample position data 102 may be data in which a low pass filter (LPF) is applied to the conversion data 101. In addition, when the characteristics of the signal to be processed are periodic, the sample position data 102 may be data that changes according to the cycle of the characteristics. For example, the sample position data 102 may be amplitude values (or values obtained by normalizing the amplitude values) showing the periodic vibration corresponding to the eigenfrequency caused by a plurality of compositions of a structure, or data indicating a beat due to the resonance of the periodic vibration caused by the eigenfrequency of each of the compositions. In addition, even if the characteristics are not periodic, the sample position data 102 may be data corresponding to the time change in a case where the time change of the characteristics is known. For example, the sample position data 102 may be a frequency characteristic (hereinafter referred to as a reference spectrum) of vibration related to a structure on which a nondestructive inspection is performed. The reference spectrum is obtained by simulating the natural vibration of the structure, the reverberation characteristic of the structure, and the like on the condition of, for example, the shape of the structure, the foundation ground of the structure, and the season when non-destructive inspection is performed.

In addition, when the vibration data has characteristics of the elapsed time such as gradually decreasing the amplitude of vibration after starting vibration measurement, the sample position data 102 may be data whose intensity monotonically decreases as illustrated in FIG. 15. At this time, the restoration target data 101 corresponds to the vibration data, and the restoration data 108 is data in which the noise in the vibration data is reduced or removed. In addition, when data whose intensity monotonically decreases as illustrated in FIG. 15 is used as the sample position data 102, the conversion function 3131 is unnecessary. In the present application example, since the contents of process related to the above-described modification example can be understood by replacing the restoration target data 101 with the conversion data, descriptions thereof will be omitted.

The acceleration sensor 303 is constituted by, for example, micro electro mechanical systems (MEMS) and measures vibration in a structure. The acceleration sensor 303 generates vibration data according to the vibration measured along the time series. The acceleration sensor 303 outputs the vibration data to the processing circuit 141.

The memory 117 stores the vibration data, the conversion data 101, the sample position data 102, and data whose noise is reduced in the conversion data 101 by the data restoration function 1413 (hereinafter referred to as restored conversion data). The restored conversion data corresponds to the restoration data 108 of FIG. 6 or the like. In addition, the memory 117 stores data (hereinafter referred to as vibration denoise data) in which an inverse Fourier transformation has been performed on the restored conversion data 108. The memory 117 stores the learned model that generates restored conversion data 108 in which vibration noise is reduced for each frequency based on the vibration data (or conversion data) and the sample position data 102. The memory 117 stores programs corresponding to various functions to be executed in the processing circuit 141. For example, the memory 117 stores a data restoration program for performing the CNN 105 corresponding to the above-described learned model.

An interface 309 corresponds to a circuit or the like related to input and output with respect to the vibration measuring apparatus 301. The interface 309 receives an input instruction from an operator. In addition, the interface 309 receives various instructions or information inputs from an external device via a wireless or wired network. In addition, the interface 309 may output the restored conversion data generated by the data restoration function 1413 to the external device or the like via the wireless or wired network.

The display 311 displays a variety of information. For example, the display 311 displays the vibration denoise data generated by the conversion function 3131 in the processing circuit 141. In addition, the display 311 displays graphical user interface (GUI) or the like for receiving various operations from the operator. As the display 311, various arbitrary displays can be appropriately used. For example, a liquid crystal display, a CRT display, an organic electro-luminescence (EL) display, or a plasma display can be used as the display 311.

The processing circuit 141 controls the vibration measuring apparatus 301 by a system control function (not illustrated). Various functions executed by the conversion function 3131, the input function 1411, and the data restoration function 1413 are stored in the memory 117 in the form of programs that are executable by a computer. The processing circuit 141 is a processor that realizes functions corresponding to the respective programs by reading programs corresponding to these various functions from the memory 117 and executing the read programs. In other words, the processing circuit 141 in a state in which each program is read has a plurality of functions illustrated in the processing circuit 141 of FIG. 22.

In FIG. 22, it has been described that these various functions are realized by the single processing circuit 141. However, the functions are realized in such a manner that the processing circuit 141 is configured by combining a plurality of independent processors and each processor executes the program. In other words, each of the above-described functions may be configured as a program and one processing circuit may execute each program, or a specific function may be implemented in a dedicated independent program execution circuit.

The overall configuration of the vibration measuring apparatus 301 in the present application example has been described. Hereinafter, the conversion function 3131, the input function 1411, and the data restoration function 1413 in the present application example will be described in detail in the description of the data restoration process using the frequency spectrum as the sample position data 102.

(Data Restoration Process)

Figure 23:
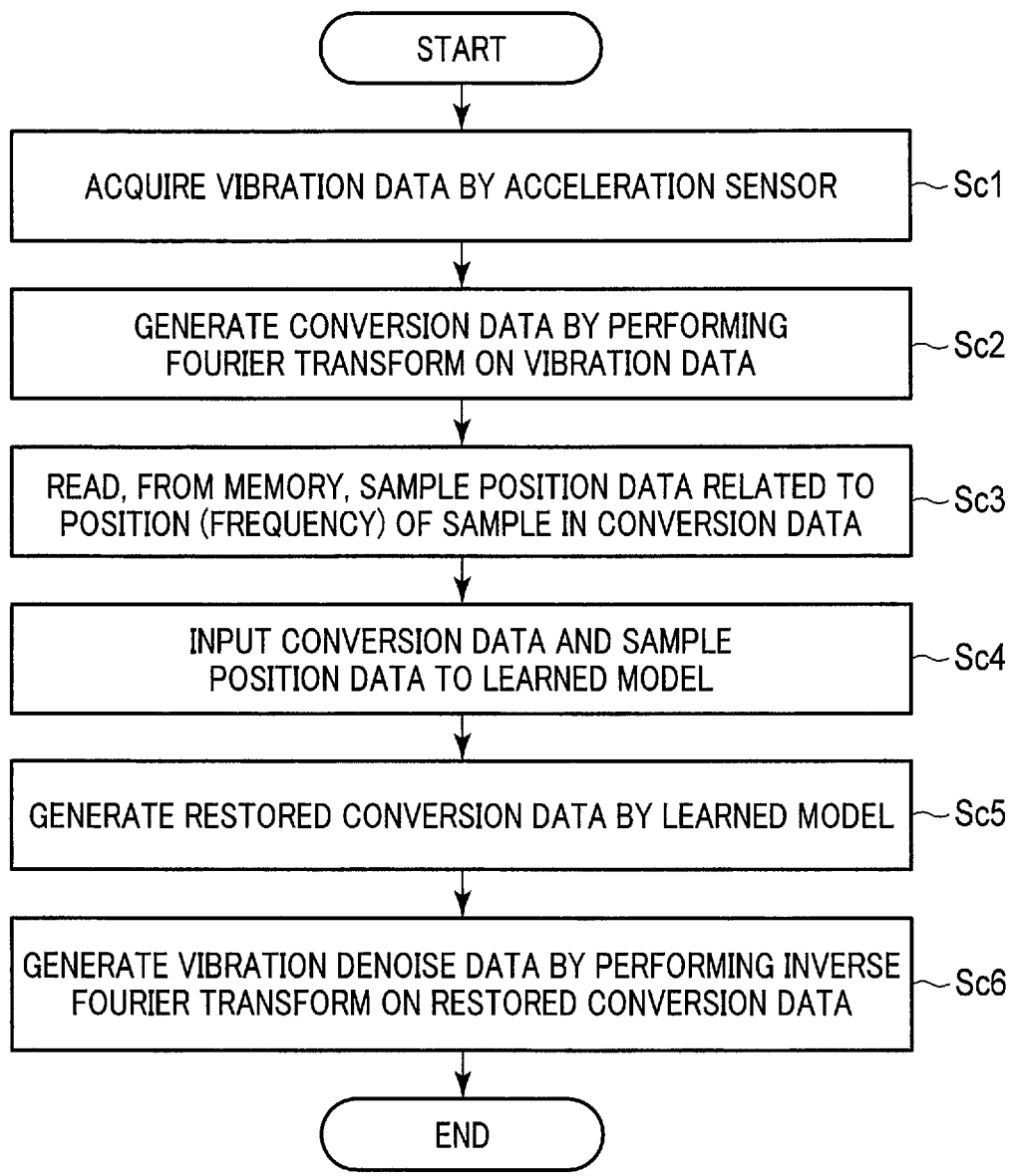
FIG. 23 is a flowchart showing an example of a procedure of a data restoration process in the third application example of the present embodiment.

The data restoration process in the present application example is a process for generating restored conversion data as restoration data 108 by executing a data restoration program using converted data 101 and sample position data 102. FIG. 23 is a flowchart showing an example of a procedure related to the data restoration process in the present application example. Hereinafter, for the sake of concrete explanation, it is assumed that the sample position data 102 is data whose intensity monotonically decreases with respect to frequency.

(Step Sc1)

The acceleration sensor 303 acquires vibration data in time series. The vibration data is output to the processing circuit 141.

(Step Sc2)

Figure 24:
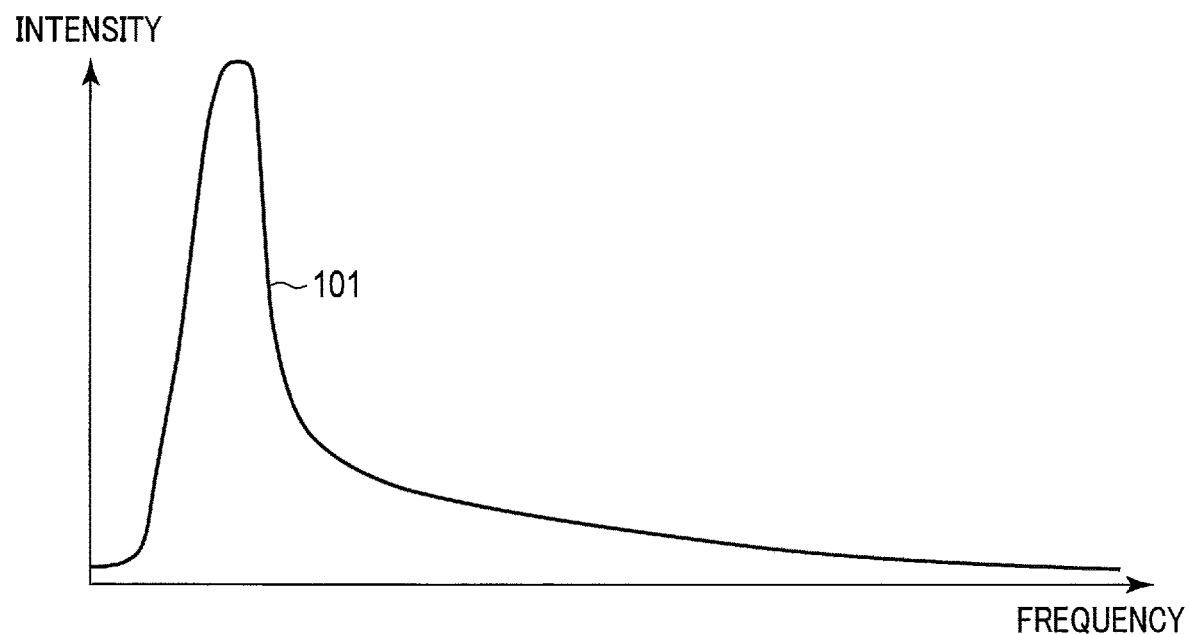
FIG. 24 is a diagram illustrating an example of conversion data in the third application example of the present embodiment.

The processing circuit 141 performs a Fourier transformation on the vibration data by the conversion function 3131. The processing circuit 141 generates conversion data 101 corresponding to the vibration data through the Fourier transformation. FIG. 24 is a diagram illustrating an example of the converted data 101. As illustrated in FIG. 24, since the conversion data 101 indicating the frequency spectrum of the vibration data is related to the acceleration, the conversion data 101 has high intensity in the low frequency component.

(Step Sc3)

Figure 25:
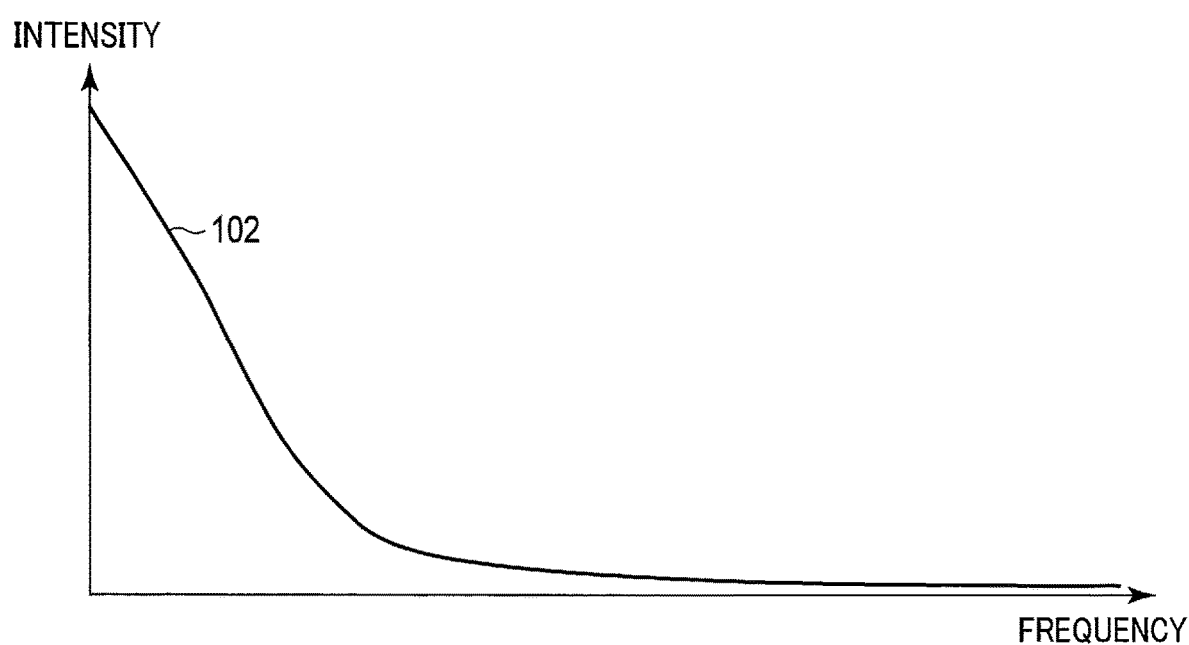
FIG. 25 is a diagram illustrating an example of sample position data in the third application example of the present embodiment.

The processing circuit 141 reads the sample position data 102 related to the position (frequency of the sample in the conversion data 101 from the memory 117 by the input function 1411. FIG. 25 is a diagram illustrating an example of the sample position data 102. As illustrated in FIG. 25, the sample position data 102 corresponds to a frequency spectrum monotonically decreasing from the intensity of the low frequency component. Note that the reading of the sample position data 102 may be performed before the process of step Sc1 or before the process of step Sc2.

(Step Sc4)

The conversion data 101 and the sample position data 102 are input to the learned model. Specifically, the processing circuit 141 inputs the conversion data 101 and the sample position data 102 to the input layer 103 by the input function 1411. More specifically, the processing circuit 141 inputs the intensity for each frequency of vibration in the conversion data 101 to a plurality of nodes in the first input range 104*a* of the input layer 103. The processing circuit 141 inputs the intensity for each frequency of vibration in the sample position data 102 to a plurality of nodes in the second input range 104*b* of the input layer 103.

The processing circuit 141 generates the combination data 104 by combining the intensity for each frequency in the conversion data 101 and the intensity for each frequency in the sample position data 102, in the input layer 103 by the data restoration function 1413. The processing circuit 141 outputs the combination data to the CNN 105. Note that in a case where the above-described modification example is used in the present application example, the processing circuit 141 inputs the conversion data 101 to the input layer 103 and inputs the sample position data 102 to at least one intermediate layer of the CNN 105.

(Step Sc5)

The processing circuit 141 generates the restored conversion data 108 by using the learned model to which the conversion data 101 and the sample position data 102 are input by the data restoration function 1413. Specifically, the processing circuit 141 generates the restored conversion data 108 by using the CNN 105 by executing the data restoration program using the conversion data 101 and the sample position data 102 by the data restoration function 1413.

(Step Sc6)

Vibration denoise data is generated by performing the inverse Fourier transformation on the restored conversion data 108. Specifically, the processing circuit 141 performs the inverse Fourier transformation on the restored conversion data 108 by the conversion function 3131. The processing circuit 141 generates the vibration denoise data in which the noise of the vibration data is reduced by the inverse Fourier transformation. The processing circuit 141 displays the vibration denoise data on the display 311. The processes of steps Sc1 to Sc4 are repeated according to the acquisition of the vibration data. In each of the repetitive processes, the same sample position data 102 is input to the CNN 105.

According to the processes by the above-described configuration, the following effects can be obtained.

According to the vibration measuring apparatus 301 of the present application example, it is possible to store the learned model for generating the restored conversion data 108 in which vibration noise is reduced in the frequency domain, based the conversion data 101 in which the Fourier transformation has been performed on the vibration data measured along the time series and the sample position data 102 related to the position (frequency) of the sample in the conversion data 101, to input the conversion data 101 and the sample position data 102 to the learned model, and generate the restored conversion data 108 by using the learned model.

Therefore, according to the vibration measuring apparatus 301 of the present application example, in the case of measuring the vibration of the object with the acceleration sensor, it is possible to improve the measurement accuracy by previously removing the surrounding vibration other than the measurement target. That is, for example, when the intensity of each frequency of the surrounding vibration is known, it is possible to generate the restored conversion data 108 as the output signal from the output layer 107 by performing the Fourier transformation on the vibration data as measurement data, setting the vibration data to the input layer 103, and setting the frequency characteristics of the environmental vibration in the input layer 103 as the sample position data 102. In addition, the vibration denoise data can be generated by performing the inverse Fourier transformation on the restored conversion data 108 as necessary.

As the modifications of the present embodiments, modification examples, and various application examples, the technical ideas related to the signal processing apparatus 1, the distance measuring apparatus 110, the voice processing apparatus 201, and the vibration measuring apparatus 301 can also be realized by installing the data restoration program on the computer such as a workstation and decompressing the data restoration program on the memory. The program that allows the computer to perform the method can also be stored and distributed in various portable storage media such as a magnetic disk, an optical disk, a semiconductor memory, and the like.

According to the signal processing apparatus 1, the distance measuring apparatus 110, the voice processing apparatus 201, the vibration measuring apparatus 301, and the distance measuring method related to the embodiments, modification example, application examples, and the like described above, it is possible to improve the signal restoration accuracy. For example, in addition to the processing target signals such as the noise removal target image 101, the sample position data 102 such as the coordinates of each pixel of the image is input to the CNN 105, thereby providing the apparatus for improving the accuracy of restoration signals. That is, according to the present embodiments, application examples, and the like, in addition to the restoration target data 101, the sample position data 102 related to the position (time, pixel coordinates, frequency, or the like) of the sample in the restoration target data 101 is input to the CNN 105, thereby providing the signal processing apparatus 1, the distance measuring apparatus 110, the voice processing apparatus 201, the vibration measuring apparatus 301, and the distance measuring method, which can improve the accuracy of data restoration.

In the embodiments, modification example, application examples, and the like described above, the noise removal has been described as an example, but as long as there are characteristics related to the position or time of the original signal, it is also effective as another embodiment related to the signal processing apparatus 1 for improving other signal deterioration, for example, sharpening blurring at the time of imaging or compressive distortion due to signal data compression.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. A signal processing apparatus comprising:
 a memory which stores a learned model for generating restoration data by restoring deterioration of a signal based on data of the signal and data related to a position of a sample of the signal; and
 a processing circuit which inputs the data of the signal and the data related to the position to the learned model and generates the restoration data by using the learned model, wherein
 the data related to the position of the sample has a value for each sample,
 the value is unique to a position of the sample in the data of the signal, and
 the position can be identified by the value.

2. The signal processing apparatus according to claim 1, wherein
 the data of the signal is data related to an image, and
 the position of the sample is coordinates of a pixel in the image.

3. The signal processing apparatus according to claim 1, wherein
 the signal is a time-series signal along time series, and
 the position of the sample is a time of the sample.

4. The signal processing apparatus according to claim 1, wherein the deterioration of the signal is noise.

5. A distance measuring apparatus comprising:
 a light receiving element which receives reflected light including a pulse reflected from an object and converts the received reflected light into a reception signal;
 a memory which stores a learned model for generating noise removal data, in which noise of the reception signal is reduced, based on data of the reception signal and data related to a position of a sample of the reception signal; and
 a processing circuit which inputs the data of the reception signal and the data related to the position of the sample of the reception signal to the learned model, generates the noise removal data by using the learned model, detects the pulse in the noise removal data, and calculates a distance of the object based on the detected pulse, wherein the data related to the position of the sample has a value for each sample, the value is unique to a position of the sample in the data of the reception signal, and the position can be identified by the value.

6. A distance measuring method comprising:

receiving reflected light including a pulse reflected from an object and converting the received reflected light into a reception signal;

inputting data of the reception signal and data relating to a position of a sample of the reception signal to a learned model for generating noise removal data, in which noise of the reception signal is reduced, based on the data of the reception signal and the data related to the position of the sample of the reception signal;

generating the noise removal data by using the learned model;

detecting the pulse in the noise removal data; and calculating a distance of the object based on the detected pulse, wherein the data related to the position of the sample has a value for each sample, the value is unique to a position of the sample in the data of the reception signal, and the position can be identified by the value.

* * * * *